United States Patent
Kitamaru

(10) Patent No.: US 8,253,967 B2
(45) Date of Patent: Aug. 28, 2012

(54) INFORMATION PROCESSING APPARATUS AND INFORMATION PROCESSING METHOD

(75) Inventor: Yoshinobu Kitamaru, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1157 days.

(21) Appl. No.: 11/501,693

(22) Filed: Aug. 10, 2006

(65) Prior Publication Data

US 2007/0035771 A1 Feb. 15, 2007

(30) Foreign Application Priority Data

Aug. 15, 2005 (JP) ................................. 2005-235496
Jul. 13, 2006 (JP) ................................. 2006-193237

(51) Int. Cl.
*G06K 15/00* (2006.01)
*G06K 15/02* (2006.01)
*G06K 9/32* (2006.01)
*H04N 1/60* (2006.01)

(52) U.S. Cl. ...................... 358/1.18; 358/1.12; 358/1.17; 358/1.11; 358/1.9; 358/2.1; 382/295; 382/296; 382/297; 382/298

(58) Field of Classification Search .................. 358/1.18
See application file for complete search history.

(56) References Cited

U.S. PATENT DOCUMENTS

| | | | | |
|---|---|---|---|---|
| 6,324,554 B1 * | 11/2001 | Watanabe et al. | ............. | 715/235 |
| 6,335,746 B1 * | 1/2002 | Enokida et al. | ............... | 715/839 |
| 6,417,931 B2 * | 7/2002 | Mori et al. | ................... | 358/1.15 |
| 6,529,214 B1 * | 3/2003 | Chase et al. | .................. | 715/744 |
| 6,774,980 B2 * | 8/2004 | Hoshino et al. | ................ | 355/40 |
| 6,868,192 B2 * | 3/2005 | Takiguchi | .................... | 382/299 |
| 6,927,865 B1 * | 8/2005 | Kujirai et al. | ................ | 358/1.12 |
| 6,934,046 B1 * | 8/2005 | Nishikawa et al. | .......... | 358/1.15 |
| 6,965,440 B1 * | 11/2005 | Nakagiri et al. | ............. | 358/1.12 |
| 6,999,117 B2 * | 2/2006 | Yamazaki | .................. | 348/222.1 |
| 7,042,496 B2 * | 5/2006 | Sato | .......................... | 348/207.2 |
| 7,253,911 B2 * | 8/2007 | Aritomi | ....................... | 358/1.13 |
| 7,289,236 B2 * | 10/2007 | Tanaka et al. | ............... | 358/1.15 |
| 7,296,242 B2 * | 11/2007 | Agata et al. | ................... | 715/793 |
| 7,386,790 B2 * | 6/2008 | Hino | ............................ | 715/269 |

(Continued)

FOREIGN PATENT DOCUMENTS

JP 2001134412 A * 5/2001

(Continued)

OTHER PUBLICATIONS

Partial English Translation of "Ichijo, Makoto, Chapter 7: Complete Understanding of Zoom Browser EX 5.0, Handbook for Canon Users", pp. 148-165, Mar. 1, 2005.

*Primary Examiner* — Hilina S Kassa

(74) *Attorney, Agent, or Firm* — Fitzpatrick, Cella, Harper & Scinto

(57) ABSTRACT

According to this invention, information desired by the user can be properly printed when index printing is performed. An information processing method of printing image and additional information added to the image on one printing medium by a printing unit includes a first display step of displaying a window for allowing a user to select desired additional information to be printed on the printing medium from pieces of additional information, and an adjusting step of adjusting the character size of the additional information so as to print all pieces of additional information selected by the user within an area where the pieces of additional information are to be printed on the printing medium.

26 Claims, 27 Drawing Sheets

U.S. PATENT DOCUMENTS

| | | | |
|---|---|---|---|
| 7,689,915 B2 * | 3/2010 | Kitamaru et al. | 715/711 |
| 2002/0048032 A1 * | 4/2002 | Ichikawa et al. | 358/1.11 |
| 2003/0160819 A1 * | 8/2003 | Chase | 345/744 |
| 2003/0184653 A1 * | 10/2003 | Ohkubo | 348/207.1 |
| 2005/0012760 A1 | 1/2005 | Yamamoto | |
| 2005/0088682 A1 * | 4/2005 | Miomo | 358/1.14 |
| 2005/0113025 A1 * | 5/2005 | Akamatsu et al. | 455/41.3 |
| 2007/0013719 A1 | 1/2007 | Yamamoto | |

FOREIGN PATENT DOCUMENTS

| | | |
|---|---|---|
| JP | 2004/355077 A | 12/2004 |
| JP | 2005/038263 A | 2/2005 |
| JP | 2005/038308 A | 2/2005 |

* cited by examiner

FIG. 8

EXAMPLE OF PRINTING APPLICATION

PRINTING FORM SETTING

INDEX PRINTING ▼

PRINTING SETTING

PRINTER: Printer A ▼
SHEET SIZE: A4 ▼
NUMBER OF COPIES: ☐

INDEX SETTING

NUMBER OF ROWS: ☐
NUMBER OF COLUMNS: ☐
☑ SHOOTING INFORMATION:

PRINTING PREVIEW

IMAGE A    IMAGE B

801

SHOOTING INFORMATION MAY BECOME SMALL IN DESIGNATED PRINTING SETTINGS.

DO YOU CONTINUE PRINTING IN THESE SETTINGS?
IF YOU CHANGE THE SETTINGS, PLEASE SELECT "NO".

NO    YES

PAGE: 1/10

CANCEL    PRINT

☐ EXAMPLE OF PRINTING APPLICATION

PRINTING FORM SETTING

INDEX PRINTING ▶

PRINTING SETTING

PRINTER: Printer A ▶
SHEET SIZE: A4 ▶
NUMBER OF COPIES: 2 ◀▶

INDEX SETTING

NUMBER OF ROWS: 2 ◀▶
NUMBER OF COLUMNS: 2 ◀▶
☑ SHOOTING INFORMATION:  SET

PRINT PREVIEW — 1701

PRINTING SHOOTING INFORMATION — 1702

☑ SHOOTING INFORMATION 1
☐ SHOOTING INFORMATION 2
☑ SHOOTING INFORMATION 3
☐ SHOOTING INFORMATION 4
☑ SHOOTING INFORMATION 5
☐ SHOOTING INFORMATION 6
☑ SHOOTING INFORMATION 7
☐ SHOOTING INFORMATION 8
☑ SHOOTING INFORMATION 9
☐ SHOOTING INFORMATION 10
☑ SHOOTING INFORMATION 11
☐ SHOOTING INFORMATION 12
☐ SHOOTING INFORMATION 13

PLEASE DESIGNATE FONT SIZE TO PRINT SHOOTING INFORMATION.

SHOOTING INFORMATION FONT SIZE: 10 ◀▶ — 1703

CANCEL   OK

— 1704

AGE B
N 1: VALUE 1B
N 2: VALUE 2B
N 3: VALUE 3B

AGE D
N 1: VALUE 1D
N 2: VALUE 2D
N 3: VALUE 3D

PAGE :1 / 10

CANCEL   PRINT

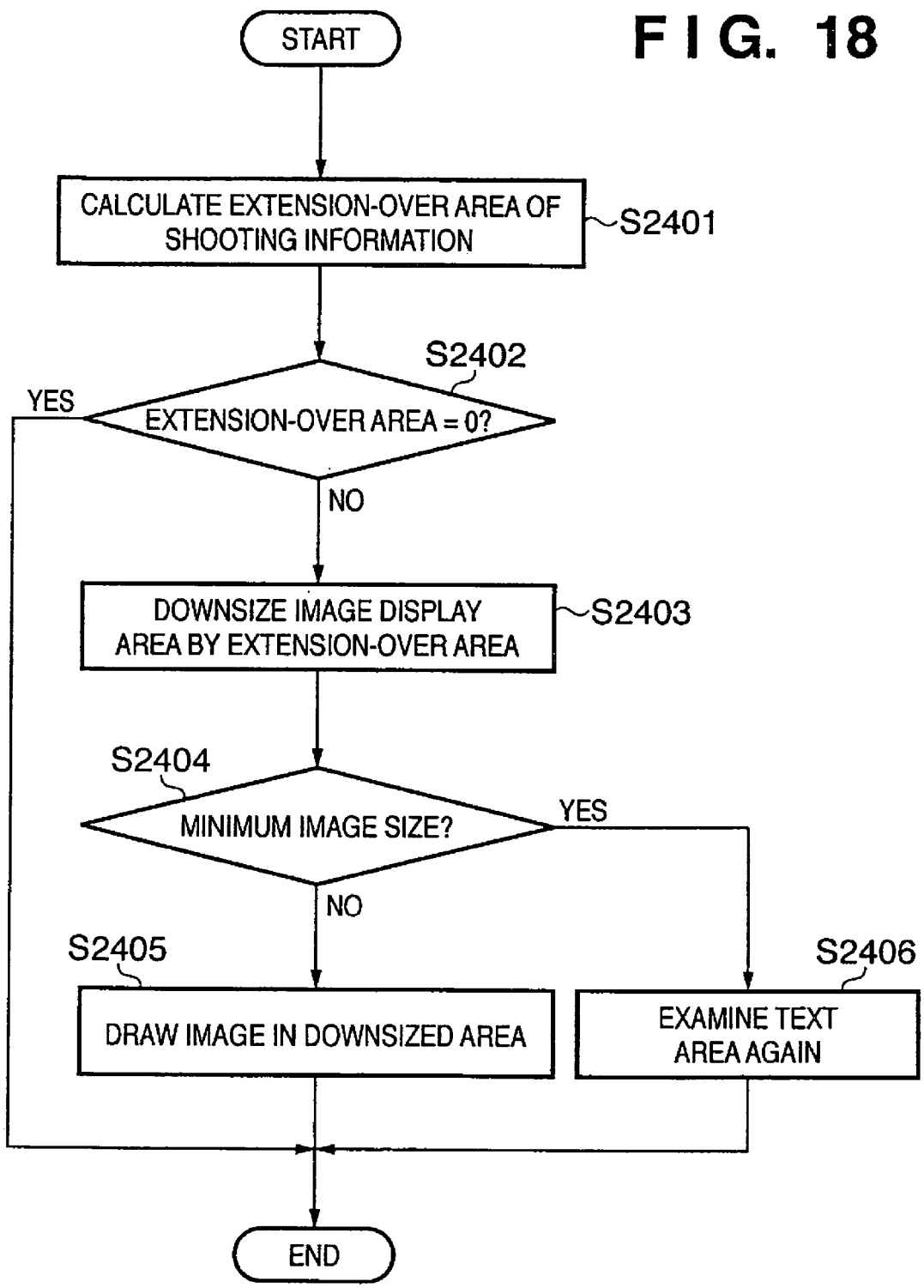

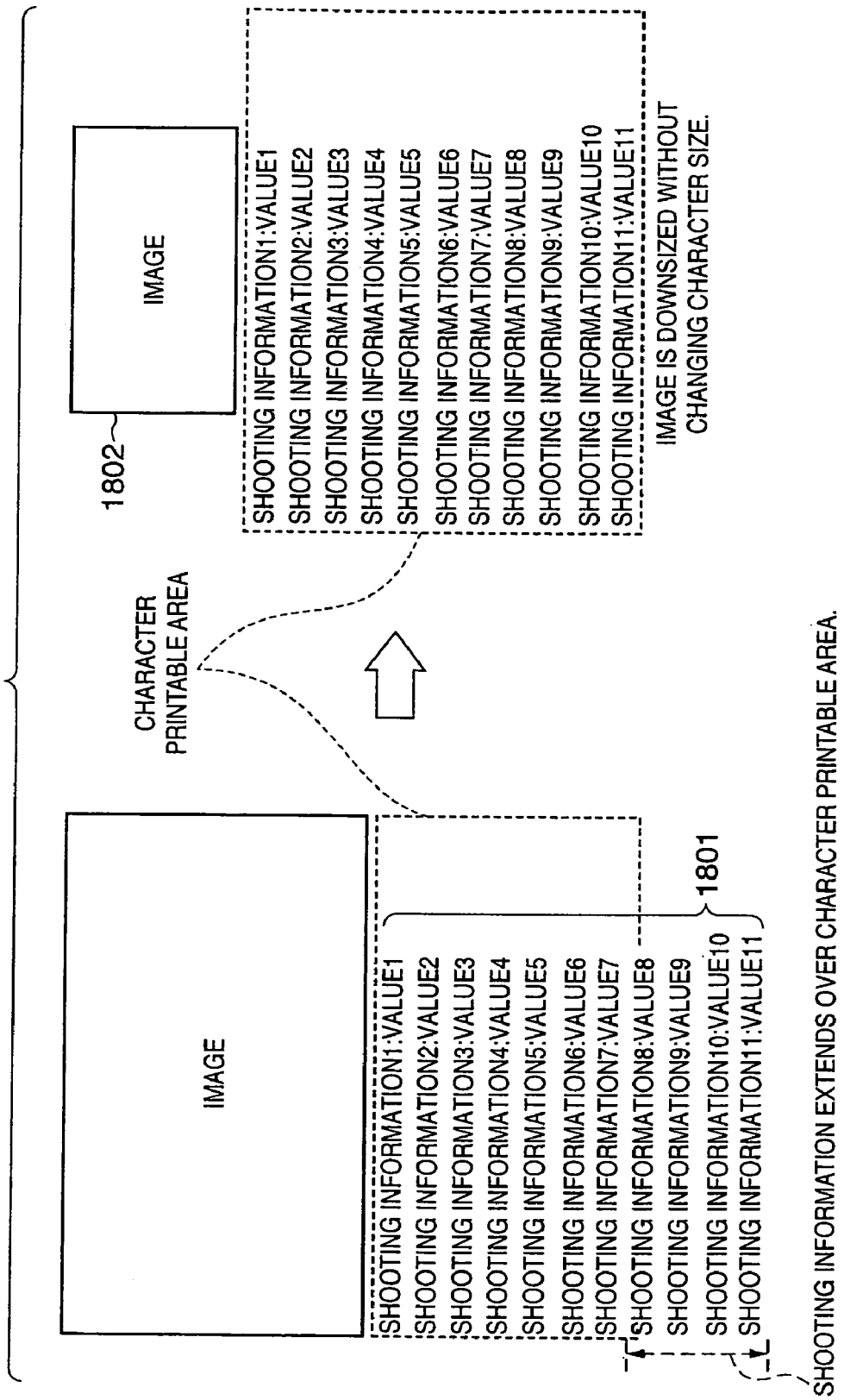

EXAMPLE OF PRINTING APPLICATION

PRINT PREVIEW

PRINTING FORM SETTING

INDEX PRINTING ▶

PRINTING SETTING

PRINTER: Printer A ▶

SHEET SIZE: A4 ▶

NUMBER OF COPIES: 2 ◆▶

INDEX SETTING

NUMBER OF ROWS: 2 ◆▶ — 2101

NUMBER OF COLUMNS: 2 ◆▶ — 2102

☑ SHOOTING INFORMATION: SET — 2103

IMAGE SIZE 160 ◆▶ — 2104

PRINTING SHOOTING INFORMATION — 2105

☑ SHOOTING INFORMATION 1
☐ SHOOTING INFORMATION 2
☑ SHOOTING INFORMATION 3
☐ SHOOTING INFORMATION 4
☑ SHOOTING INFORMATION 5
☐ SHOOTING INFORMATION 6
☑ SHOOTING INFORMATION 7
☐ SHOOTING INFORMATION 8
☑ SHOOTING INFORMATION 9
☐ SHOOTING INFORMATION 10
☑ SHOOTING INFORMATION 11
☐ SHOOTING INFORMATION 12
☑ SHOOTING INFORMATION 13

PLEASE DESIGNATE FONT SIZE TO PRINT SHOOTING INFORMATION.

SHOOTING INFORMATION FONT SIZE: 10 ◆▶ — 2107

CANCEL    OK — 2108

AGE B — 2106
N 1: VALUE 1B
N 2: VALUE 2B
N 3: VALUE 3B

AGE D
N 1: VALUE 1D
N 2: VALUE 2D
N 3: VALUE 3D

PAGE: 1/10

CANCEL    PRINT

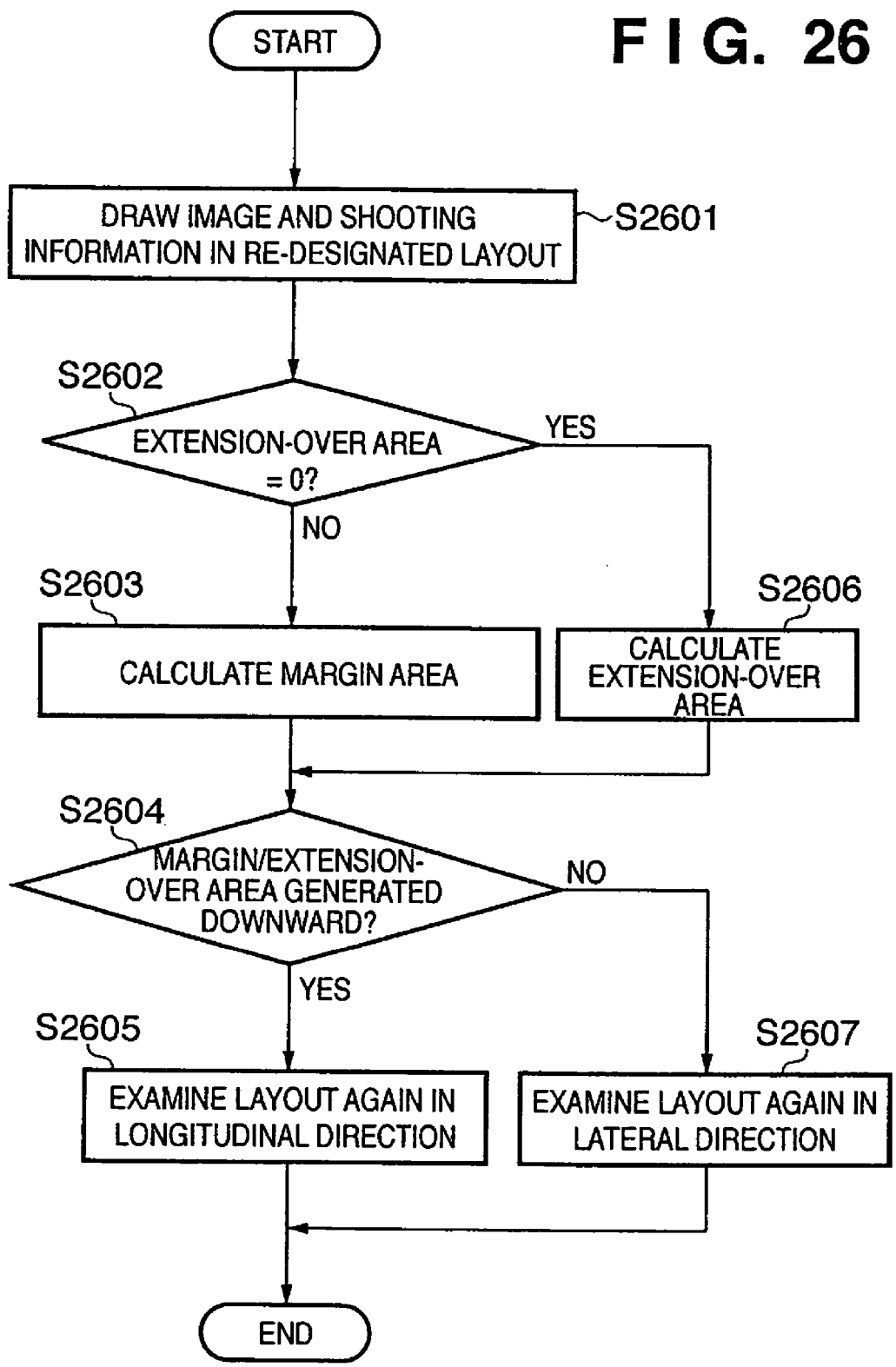

INFORMATION PROCESSING APPARATUS AND INFORMATION PROCESSING METHOD

BACKGROUND OF THE INVENTION

1. Field of the Invention

The present invention relates to a technique of printing an image and additional information of the image.

2. Description of the Related Art

Along with recent spread of digital cameras and printers, a user having a digital camera and printer at home can easily establish an environment in which he can easily print many high-quality photographs. As PCs (Personal Computers) become popular, the user can also install software capable of printing and print freely in various forms.

For example, the software provides a layout printing function of freely laying out images and printing by the user, and an index printing function of printing shooting information of a camera together with an image.

One of related references is "Makoto Ichijo, 'Handbook for Canon Users! Complete Understanding of Zoom Browser EX 5.0', pp. 137-165, Gijutsu-Hyohron".

Even conventional software has a function called index printing to simultaneously print information photographed by a camera and the shooting information. Index printing has a merit of easily confirming photographing parameters used in photographing by printing an image and shooting information side by side. Since an image and shooting information are printed side by side, this is very useful in examining which parameters bring the best image when sequential shooting is done while photographing parameters are changed.

FIG. 1 is a view schematically showing the UI (User Interface) of conventional printing software.

In FIG. 1, reference numeral 101 denotes a pull-down menu for selecting a print mode in which printing can be done by printing software. From the pull-down menu 101, the user can switch the printing method between layout printing, index printing, and the like. Reference numeral 102 denotes an area where a printer, printing sheet, and the like can be switched. Reference numeral 103 denotes an area for determining a layout in index printing. By designating the numbers of rows and columns, the number of images on one sheet is determined. After shooting information is set, an image and shooting information added to the image are displayed. Changes of the settings in the areas 101, 102, and 103 influence a printing preview area 105. When these settings are changed, they are reflected in the preview area 105 in real time. Reference numeral 104 denotes a button group of "close", "maximize", and "minimize" buttons adopted in most software programs. If "print" is selected from a button group 106, printing starts; if "cancel" is selected, the software ends.

According to a conventional printing method, fixed information is printed in a fixed form. That is, shooting information designated in advance by a program is printed in a fixed font and font size. Since necessary information changes depending on the user, the system shown in FIG. 1 tries to solve this problem by selecting the number of pieces of shooting information to be printed from, e.g., three levels "large/middle/small", as shown in the area 103.

According to the conventional method, for example, when "small" is selected, "file name/image size/input device name/photographing date & time" are displayed. When "middle" is selected, "exposure time/F number/exposure compensation value/focal length of a 35 mm film lens/flash" are displayed in addition to the items displayed upon selecting "small". When "large" is selected, "digital data creation date & time/Exif version/color space information/device model" are displayed in addition to the items displayed upon selecting "middle".

According to this method, the number of display items of shooting information can be selected, but the contents are fixed by the program and cannot be designated by the user. There are various types of printable information such as shooting information of a digital camera and information newly added by an information processing apparatus or the like. Information desired among these pieces of information varies depending on the user. Not all pieces of printing information provided by a printing information device are always sufficient for the user. As a result, even unnecessary information may be simultaneously printed.

In the conventional system, the font size is fixed to a predetermined one in printing information, as described above. When a piece of information is very long, not all characters can be printed, and the information may be cut off in the middle of it.

SUMMARY OF THE INVENTION

The present invention has been made to overcome the conventional drawbacks, and has as its object to properly print information desired by the user when index printing is performed.

To solve the above problems and achieve the above object, according to the first aspect of the present invention, an information processing apparatus which prints image and additional information added to the image on one printing medium by a printing unit comprises a selection unit which allows a user to select desired additional information to be printed on the printing medium from pieces of additional information, and an adjusting unit which adjusts a layout of characters of the additional information so as to print the additional information selected by the selection unit within an area where the additional information is to be printed on the printing medium.

According to the second aspect of the present invention, an information processing method of printing image and additional information added to the image on one printing medium by a printing unit comprises a selecting step of allowing a user to select desired additional information to be printed on the printing medium from pieces of additional information, and an adjusting step of adjusting a layout of characters of the additional information so as to print the additional information selected in the selecting step within an area where the additional information is to be printed on the printing medium.

According to the third aspect of the present invention, an information processing apparatus which prints image and additional information added to the image on one printing medium by a printing unit comprises a selection unit which allows a user to select desired additional information to be printed on the printing medium from pieces of additional information, a designating unit which designates a size for printing the image and a character size for printing the additional information, and a sheet changing unit which changes a size of a sheet used for printing in accordance with the image to be printed on the printing medium and the additional information selected by the selection unit.

According to the fourth aspect of the present invention, an information processing apparatus which prints image and additional information added to the image on one printing medium by a printing unit comprises a selection unit which allows a user to select whether to print the additional information on the printing medium together with an image based on the image, and an adjusting unit which adjusts the number of images to be printed on the printing medium on the basis of selection by the selection unit.

According to the fifth aspect of the present invention, an information processing method of printing image and additional information added to the image on one printing medium by a printing unit comprises a selecting step of allowing a user to select desired additional information to be printed on the printing medium from pieces of additional information, a designating step of designating a size for printing the image and a character size for printing the additional information, and a sheet changing step of changing a size of a sheet used for printing in accordance with the image to be printed on the printing medium and the additional information selected in the selecting step.

According to the sixth aspect of the present invention, an information processing method of printing image and additional information added to the image on one printing medium by a printing unit comprises a selecting step of allowing a user to select whether to print the additional information on the printing medium together with an image based on the image, and an adjusting step of adjusting the number of images to be printed on the printing medium on the basis of selection in the selecting step.

Further features of the present invention will become apparent from the following description of exemplary embodiments (with reference to the attached drawings).

BRIEF DESCRIPTION OF THE DRAWINGS

FIG. 8 is a view showing an example of a dialog displayed when it is determined that the characters of a printing result become small;

FIG. 12 is a view showing an example of displaying the displayable shooting information count in a setting dialog;

FIG. 17 is a view showing a state in which the shooting information setting dialog of an information processing apparatus is displayed in the fifth embodiment;

FIG. 18 is a flowchart showing an operation of downsizing an image without changing the character size in the fifth embodiment;

FIG. 19 is a view showing a state in which an image and shooting information are displayed in one column in the fifth embodiment;

FIG. 20 is a view showing a setting window in the sixth embodiment;

FIG. 24 is a view showing a layout setting window in the eighth embodiment;

FIG. 26 is a flowchart showing an operation in the eighth embodiment.

DESCRIPTION OF THE EMBODIMENTS

Preferred embodiments of the present invention will be described in detail below with reference to the accompanying drawings.

First Embodiment

Figure 1:
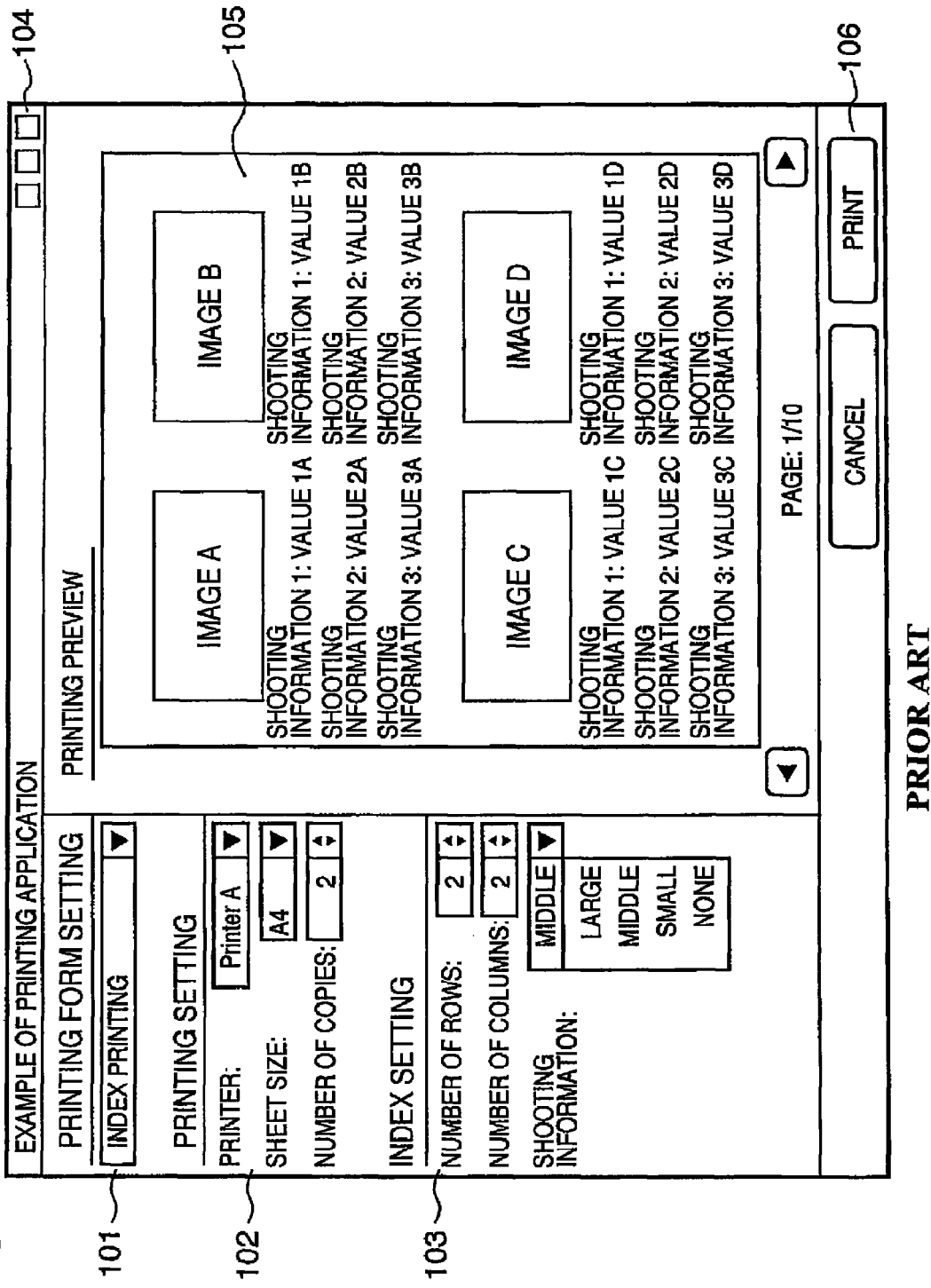
FIG. 1 is a view showing an example of conventional printing software.
Figure 2:
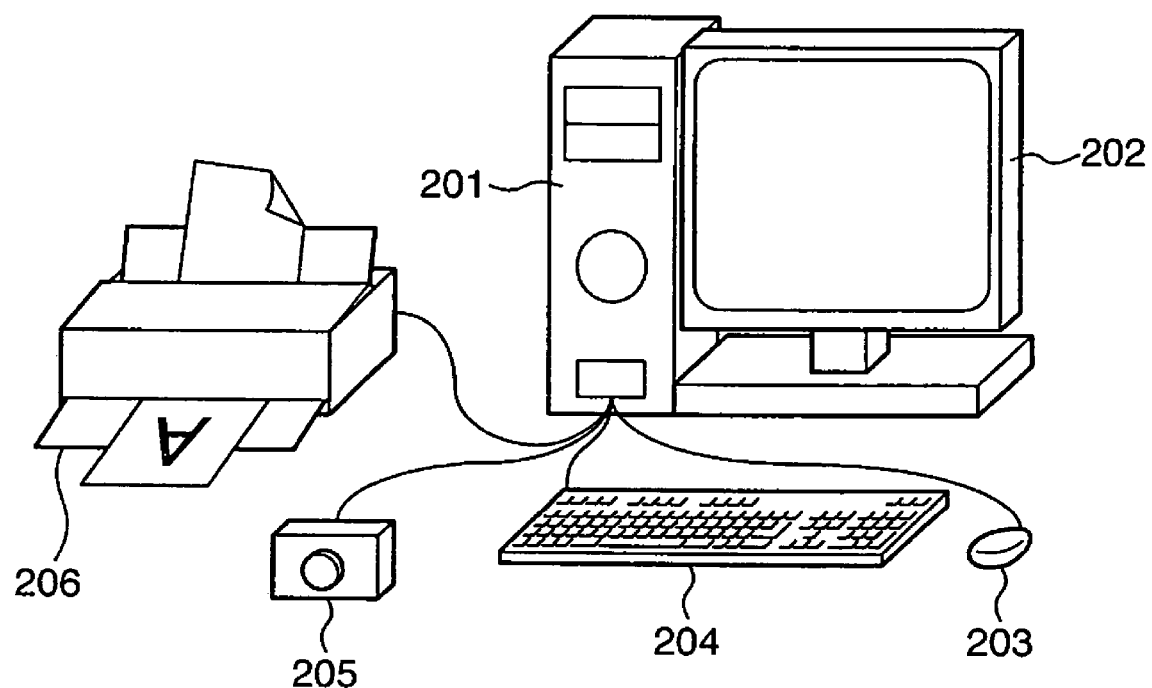
FIG. 2 is a view showing an example of the configuration of a computer system in an embodiment of the present invention.

FIG. 2 is a view showing an example of the configuration of a personal computer system serving as a platform in which an information processing method according to the present invention can be practiced.

In FIG. 2, reference numeral 201 denotes a computer system main body; 202, a display which displays data; 203, a mouse serving as a typical pointing device; and 204, a keyboard. Reference numeral 205 denotes a digital camera which takes a picture. However, the present invention is not limited to the digital camera, and can adopt any image input device. Reference numeral 206 denotes a printer which prints.

Figure 3:
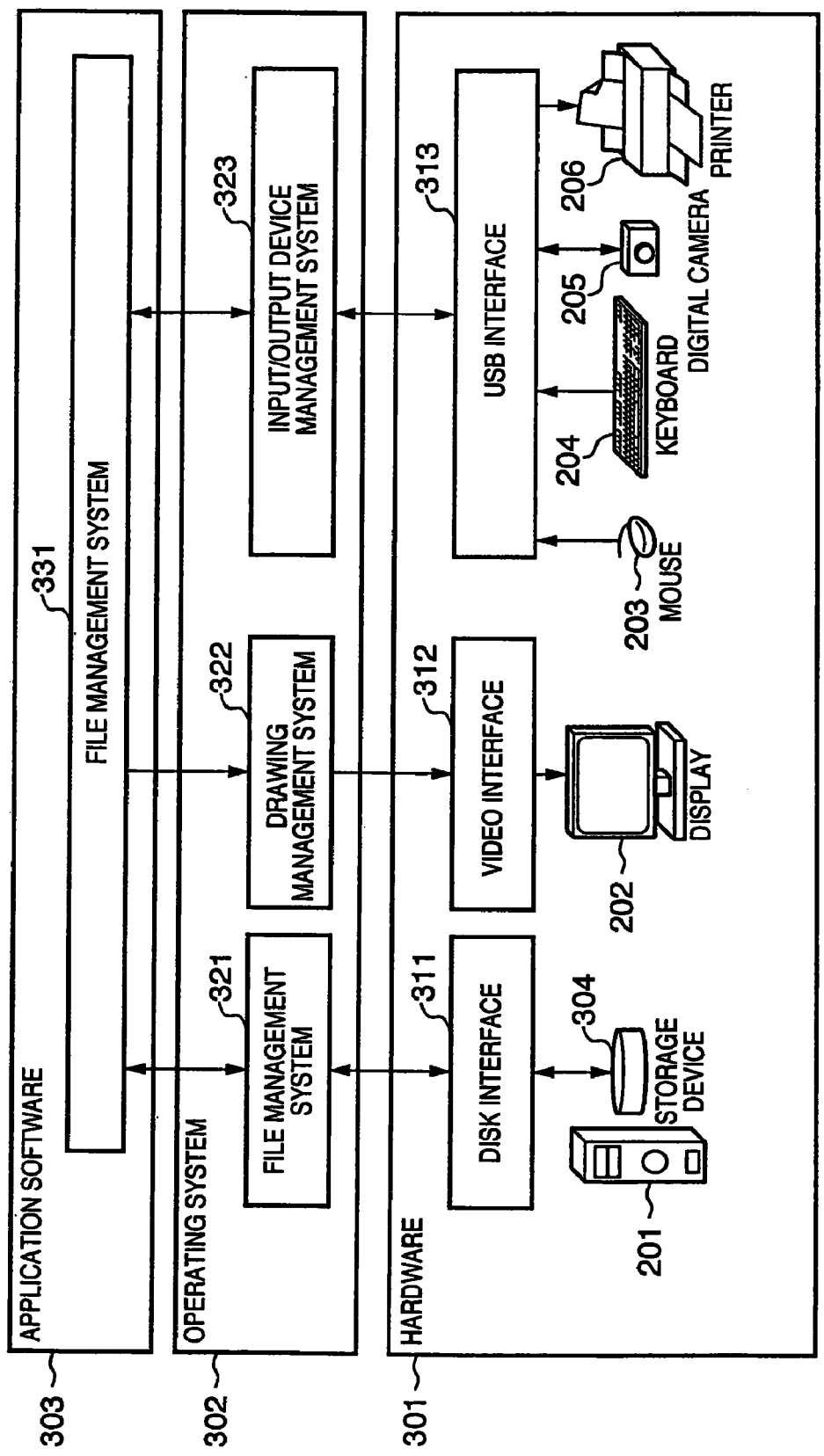
FIG. 3 is a view showing an example of the overall configuration of an information management apparatus including software and hardware in the embodiment of the present invention.

FIG. 3 is a view showing the configuration of an image data management system including software and hardware.

In FIG. 3, reference numeral 301 denotes hardware; 302, an operating system (OS) which runs on the hardware 301; 303, application software which runs on the OS 302. Of blocks which build the hardware 301 and OS 302, blocks unnecessary to describe the first embodiment are not illustrated. Examples of the unillustrated blocks are a CPU and memory in the hardware and a memory management system in the OS.

In FIG. 3, reference numeral 304 denotes a storage device such as a hard disk which physically stores files and data in the computer system main body 201. Reference numeral 321 denotes a file management system which builds the OS 302 and has a function of allowing the application software 303 to input/output a file without any consciousness of the hardware 301. Reference numeral 311 denotes a disk I/O interface for reading/writing data from/in the storage device 304 by the file management system 321. Reference numeral 322 denotes a drawing management system which builds the OS 302 and has a function of allowing the application software 303 to draw an image without any consciousness of the hardware 301. Reference numeral 312 denotes a video interface for drawing an image on the display 202 by the drawing management system 322. Reference numeral 323 denotes an input/output device management system which builds the OS 302 and has a function of allowing the application software 303 to receive an input from the user and an output from an application without any consciousness of the hardware 301. Reference numeral 313 denotes a USB interface which allows the input/output device management system 323 to comprehensively manage inputs and outputs such as inputs from the keyboard, mouse, and the like, inputs and outputs from and to the digital camera, and outputs to the printer.

Figure 4:
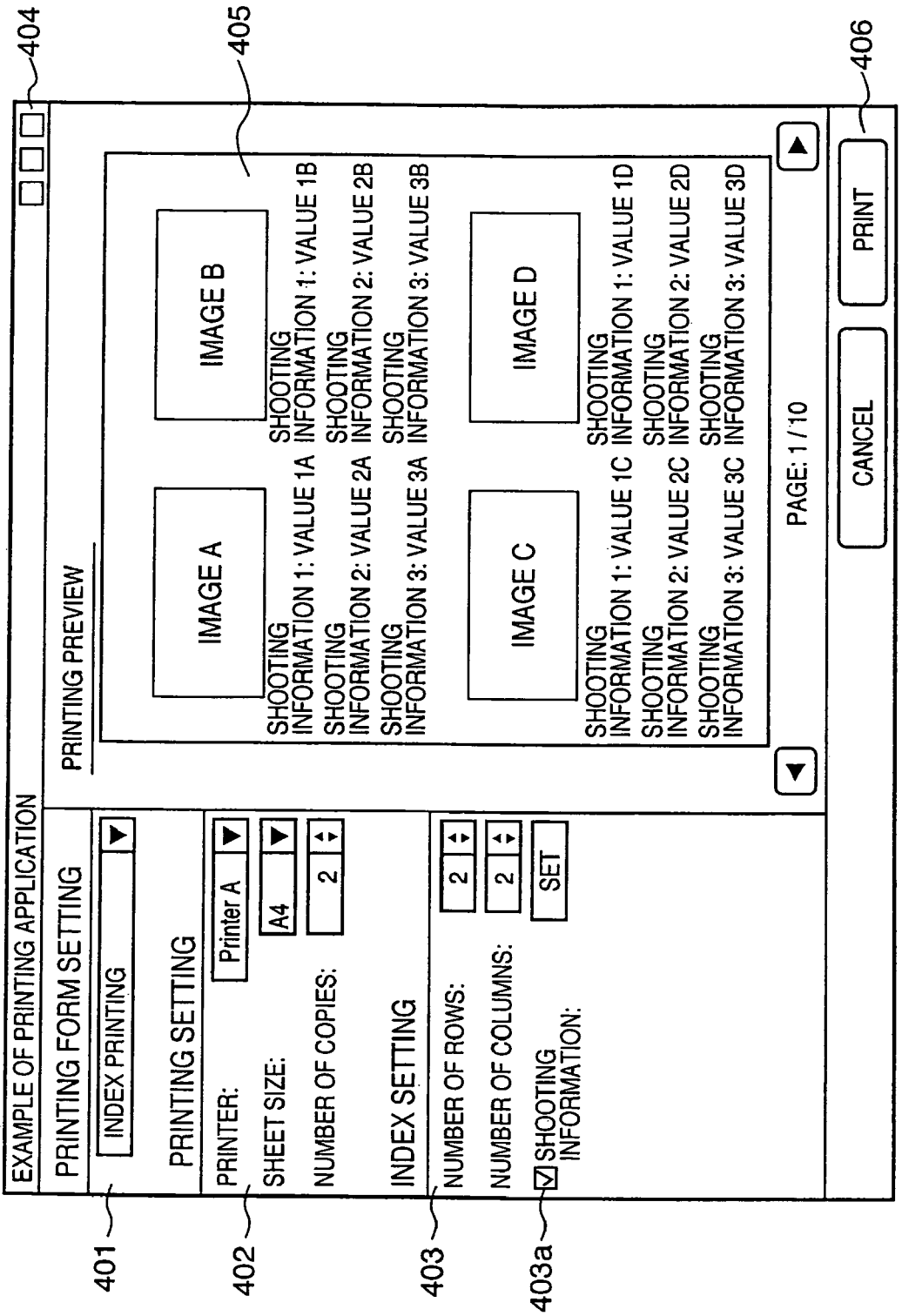
FIG. 4 is a view showing an example of the UI of software in the embodiment of the present invention.

FIG. 4 is a view schematically showing the UI (User Interface) of printing software in the first embodiment.

Reference numeral 401 denotes a pull-down menu for selecting a print mode in which printing can be done by printing software, similar to the prior art. From the pull-down menu 401, the user can switch the printing method between layout printing, index printing, and the like. Reference numeral 402 denotes an area where a printer, printing sheet, and the like can be switched. Reference numeral 403 denotes an area for determining a layout in index printing. By designating the numbers of rows and columns in the area 403, the number of images on one sheet is determined. Display/non-display of shooting information can be switched by setting/removing a check in a check box 403a beside the display "shooting information". The contents of shooting information to be displayed are set by clicking a "set" button.

Changes of the settings in the areas 401, 402, and 403 influence the display contents of a printing preview area 405. When these settings are changed, the contents are reflected in the printing preview area 405 in real time. Reference numeral 404 denotes a button group of "close", "maximize", and "minimize" buttons adopted in most software programs. If "print" is selected from a button group 406, printing starts; if "cancel" is selected, the software ends.

Figure 5:
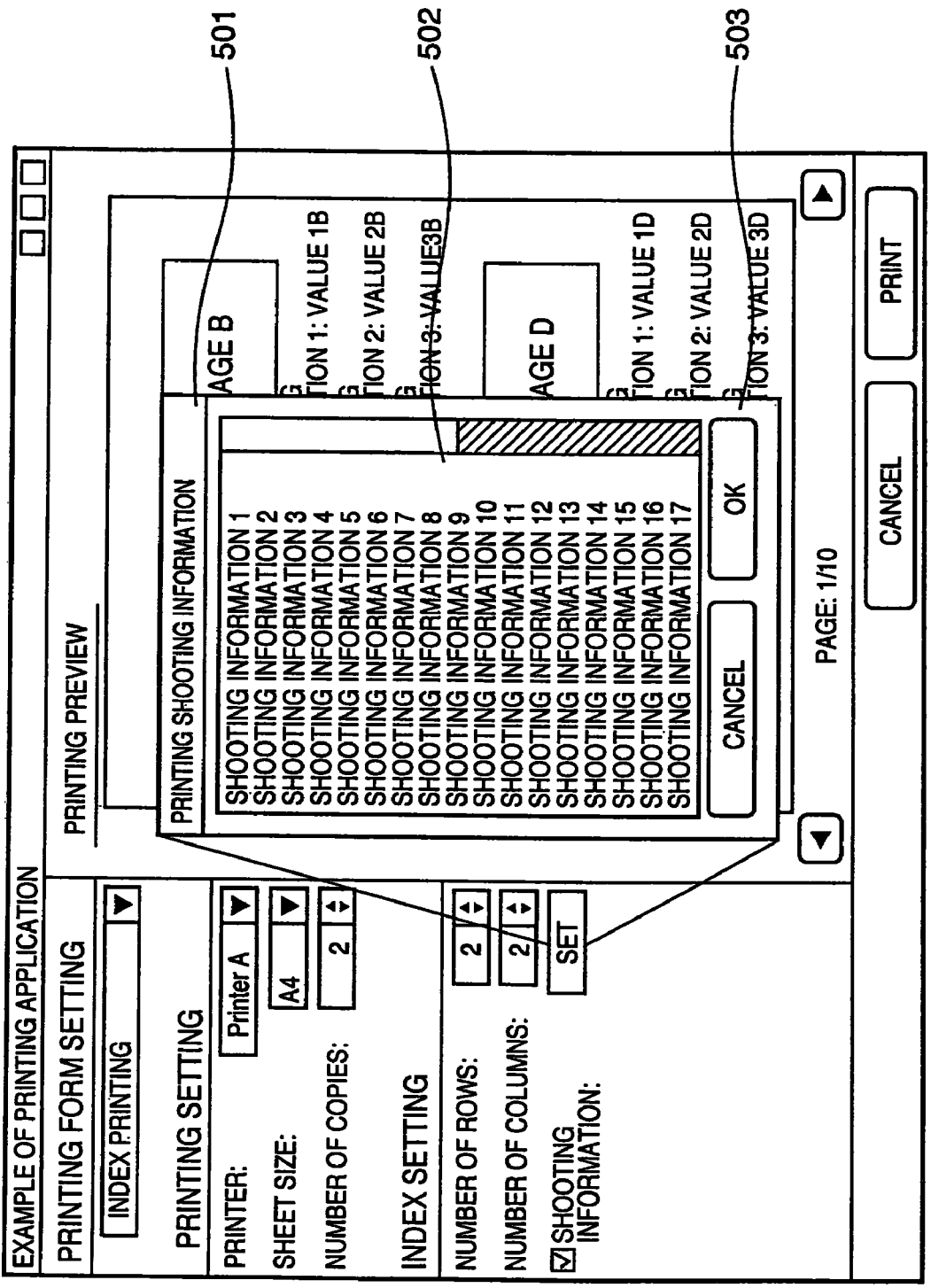
FIG. 5 is a view showing an example of a UI for setting shooting information to be printed in the first embodiment of the present invention.

FIG. 5 is a view showing an example of a setting dialog displayed upon clicking the "set" button in the area 403.

When the "set" button in the area 403 is clicked, a shooting information setting dialog 501 is displayed. The user selects desired shooting information to be printed from a shooting information list 502. The user clicks an "OK" button 503 after selection, and then the result is reflected in the printing preview area 405. Items displayed in the shooting information list 502 include information added upon photographing with a camera, information added in the information processing apparatus, and information added by another image management apparatus or the like. Examples of these items are items "favorite level" and "keyword" added to an image by another image management apparatus or the like.

Figure 6:
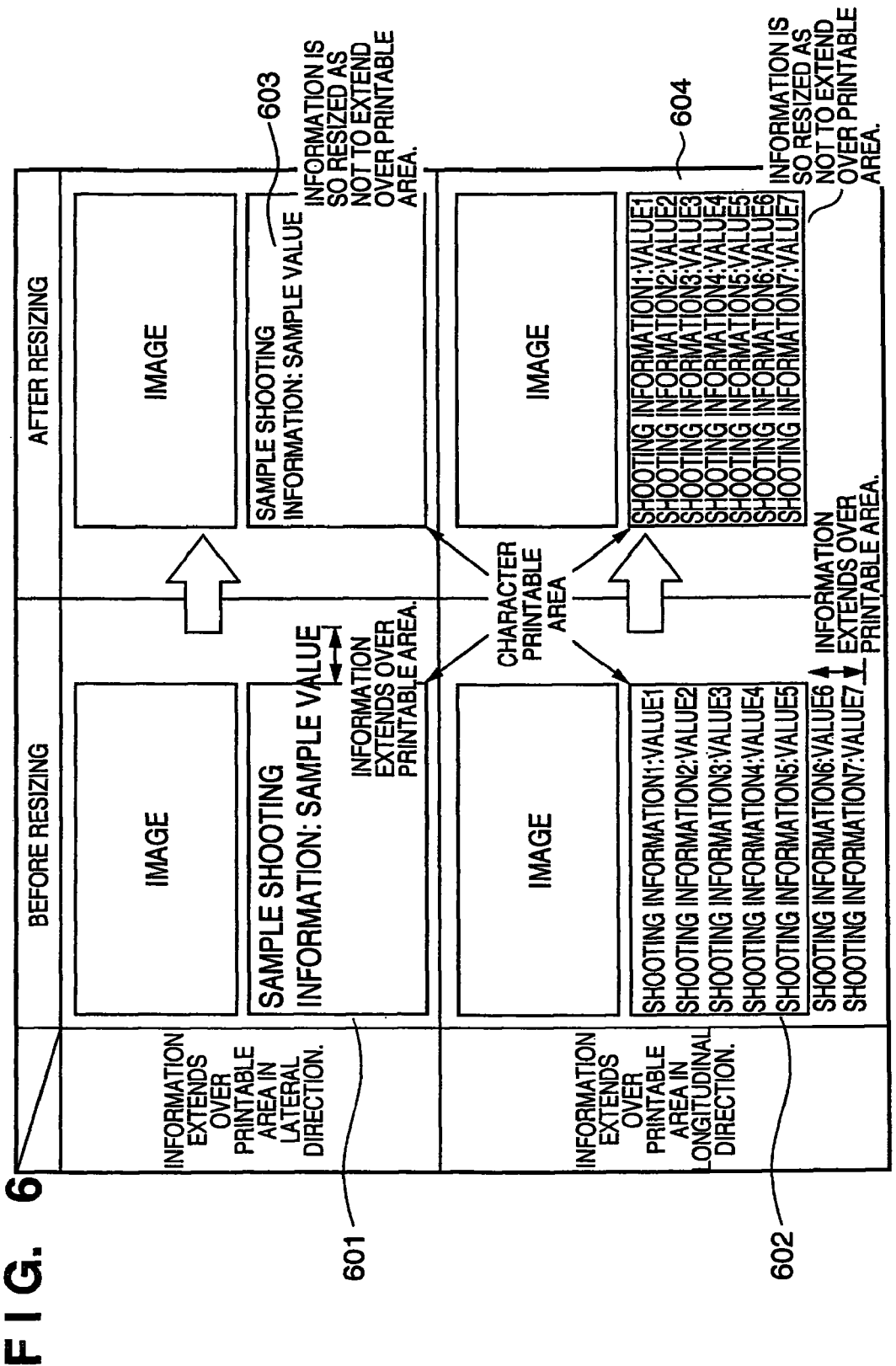
FIG. 6 is a conceptual view when display information extends over the printing area.

When these pieces of information are displayed, they may extend over an information printable area prepared by the program, as represented by 601 and 602 in FIG. 6. In the conventional system, if information extends over the printable area, no extending character is displayed. In the first embodiment, however, the characters are automatically resized small so as not to cut them off in the middle of the character string, as represented by 603 and 604 in FIG. 6.

Figure 7:
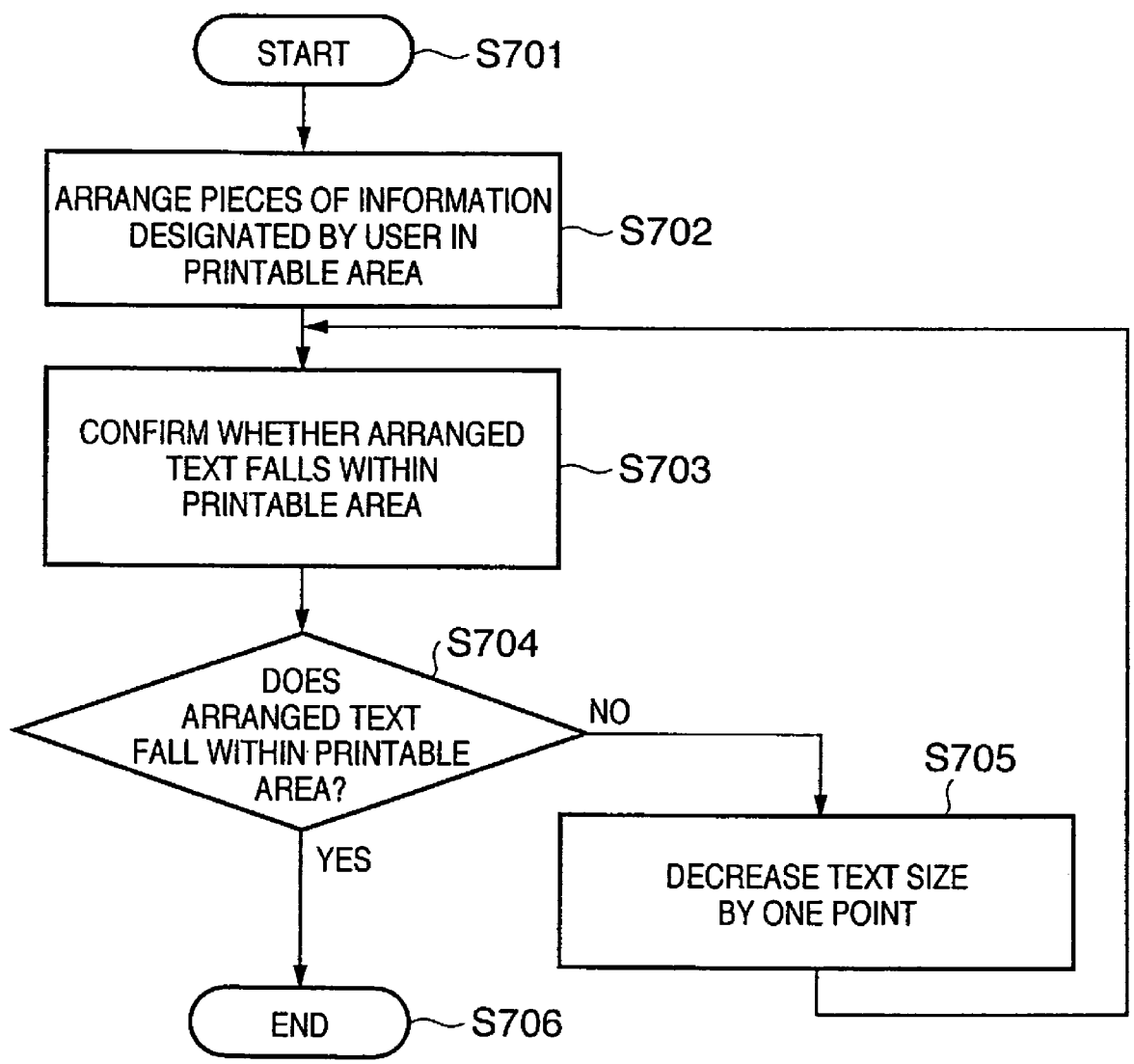
FIG. 7 is a flowchart showing a process performed by an information processing apparatus when display information extends over the printing area.

These processes are shown as a flowchart in FIG. 7.

When the "OK" button 503 is clicked, the process starts from step S701.

In step S702, pieces of information selected by the user from the shooting information list 502 are laid out in the printable area. In step S703, it is calculated whether these pieces of information fall within the printable area. If it is determined in step S704 that these pieces of information fall within the printable area, the flow advances to step S706 and ends. If it is determined in step S704 that these pieces of information do not fall within the printable area, the font size is decreased by one point in step S705. After that, it is calculated again in step S703 whether these pieces of information fall within the printable area. The text point is decreased until the pieces of information to be printed fall within the printable area. As a result, characters can be displayed without cutting them off.

Figure 9:
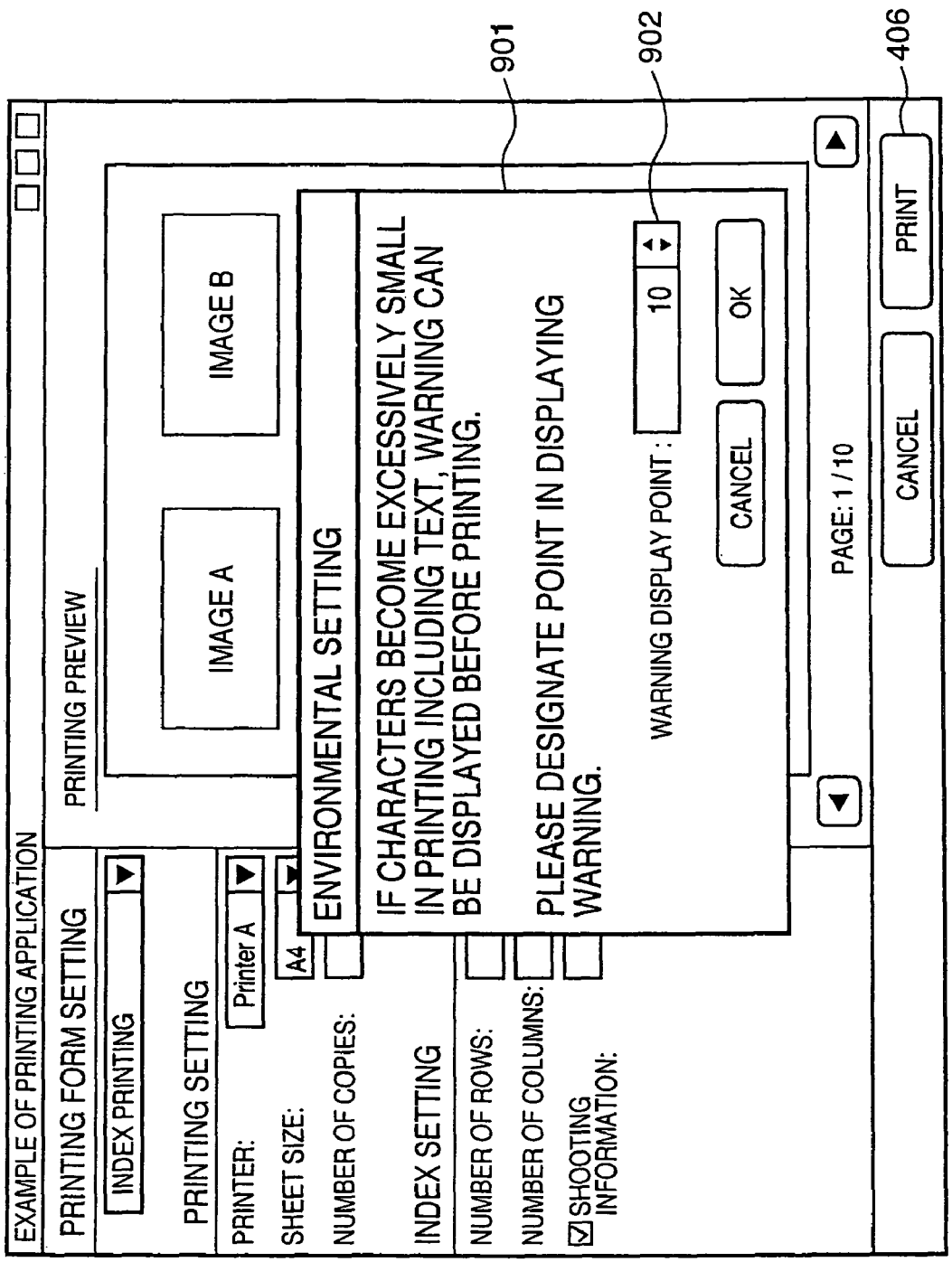
FIG. 9 is a view showing an example of a dialog for setting the character point when a warning is displayed.

If the font is automatically decreased, it is expected that the font becomes too small to recognize the finally printed characters by the user. As a solution to this problem, according to the first embodiment, the character size in printing is calculated before printing, and if it becomes equal to or smaller than a predetermined font size, a warning is displayed as represented by 801 in FIG. 8 to prompt the user to determine whether to print. The predetermined font size serving as a criterion for determining whether to display a warning may be set in advance by the program. Alternatively, the predetermined font size may be set by the user in environmental setting as represented by 901 in FIG. 9 because visibility changes depending on the visual acuity of the user or the like.

Figure 10:
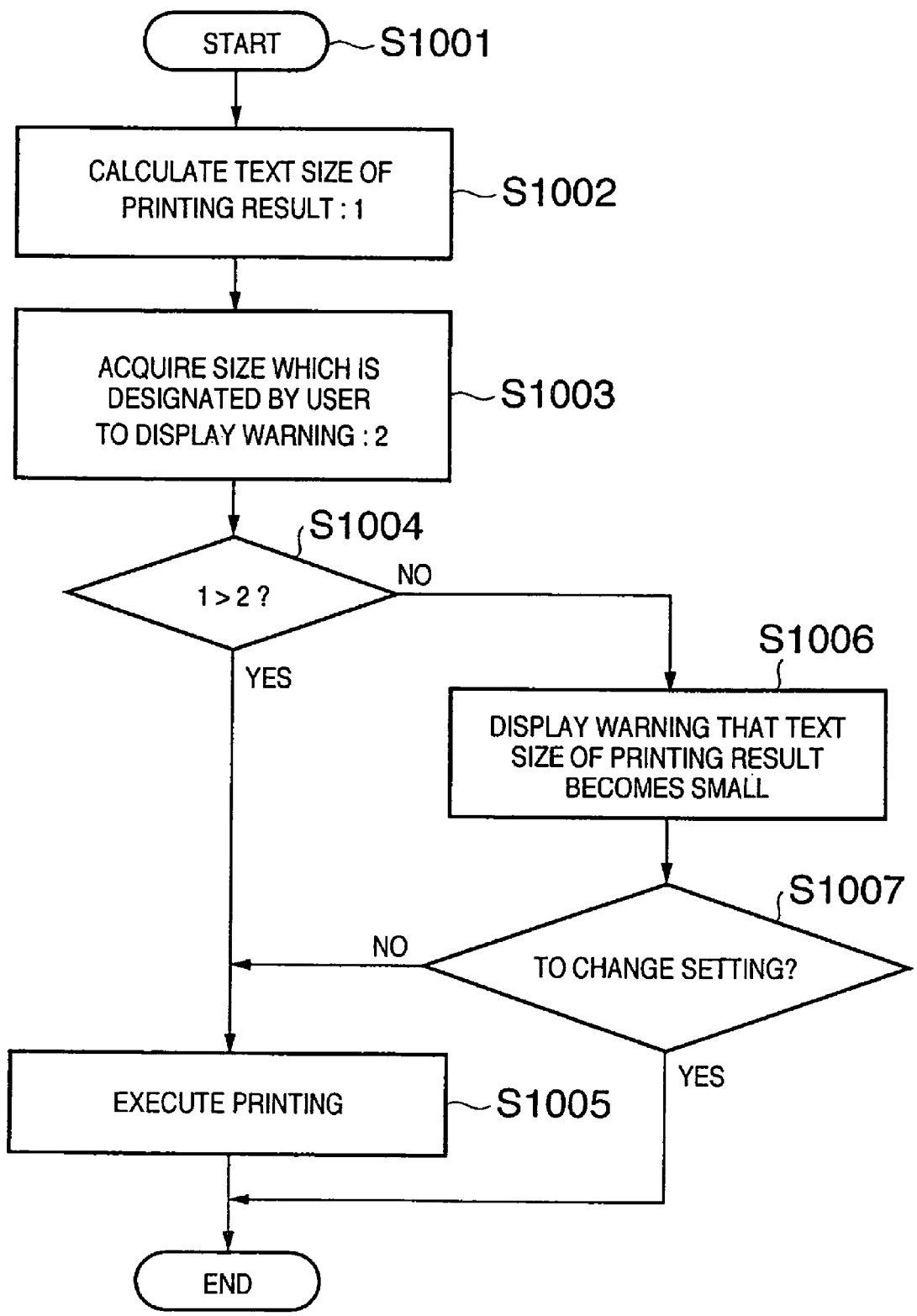
FIG. 10 is a flowchart from warning display to printing.

FIG. 10 is a flowchart from warning display to printing.

If the "print" button of the button group 406 is clicked, the process starts from step S1001. The timing when step S1001 is performed is not limited to one when the "print" button is clicked, but may be one when an image is drawn in the printing preview area 405. This flowchart explains a process of displaying the warning dialog in FIG. 8 when the "print" button is clicked.

The process starts from step S1001, and the text (character) size in actual printing is calculated in step S1002. In step S1003, a font size designated in FIG. 9 or a font size designated in advance by the program is acquired. In step S1004, the calculated size and the acquired font size are compared with each other. If the text size in actual printing is larger than the font size at which a warning is displayed, printing starts in step S1005 without performing any process. If the text size of the printing result is smaller than the font size at which a warning is displayed, the warning dialog 801 is displayed in step S1006. If "YES" is selected in the warning dialog 801 (step S1007: NO), printing is executed without changing the setting. If "NO" is selected (step S1007: YES), the UI returns to one in FIG. 4. Before actual printing, the user can recognize that characters are too small, and can change the setting to avoid printing of excessively small characters.

The font size serving as a threshold for displaying a warning also depends on the output device (printer). For example, even characters which can be recognized upon printing by a high-resolution output device may be hardly recognized upon printing by a low-resolution output device even at the same setting. At this time, the information processing apparatus may acquire the resolution from the output device and change, depending on the resolution, the font size (to be also referred to as a warning size hereinafter) serving as a threshold for displaying a warning.

Figure 11:
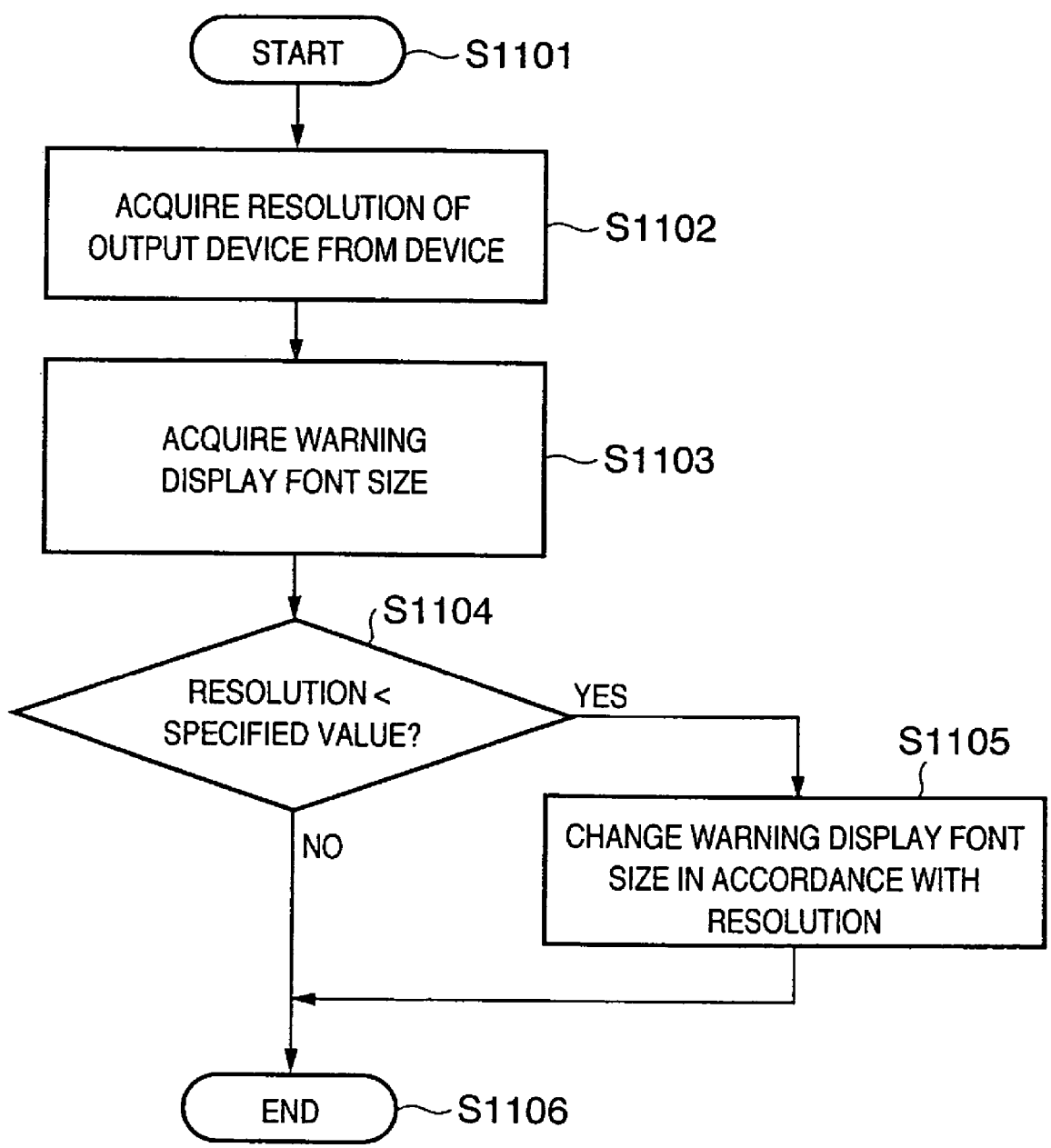
FIG. 11 is a flowchart when the font size serving as a threshold for displaying a warning is changed in accordance with the resolution of an output device.

FIG. 11 is a flowchart when the warning size is changed.

When the warning size is required in the information processing apparatus, the process starts from step S1101.

In step S1102, the resolution of a prospective output device (printer) is acquired from the device. In step, S1103, a warning size (warning display font size) designated in FIG. 9 or a warning size designated in advance by the program is acquired. In step S1104, it is determined whether the resolution of the output device requires a change of the warning size. If the output device has a resolution requiring a change of the warning font size (warning size) (YES in step S1104), the font size (warning size) is automatically changed in step S1105, and the process ends in step S1106. If it is determined in step S1104 that the output device has a sufficient resolution, the process directly advances to step S1106 and ends. In this case, the resolution of the printing preview area 405 may also be changed in accordance with that of the output device.

Second Embodiment

In the first embodiment, a warning is displayed when characters to be printed become excessively small. In the second embodiment, characters are directly printed without displaying any warning. The displayable information count can be calculated in advance as far as the sheet size, the numbers of rows and columns in index printing, and the font size at which a warning is displayed are determined.

Figure 12:
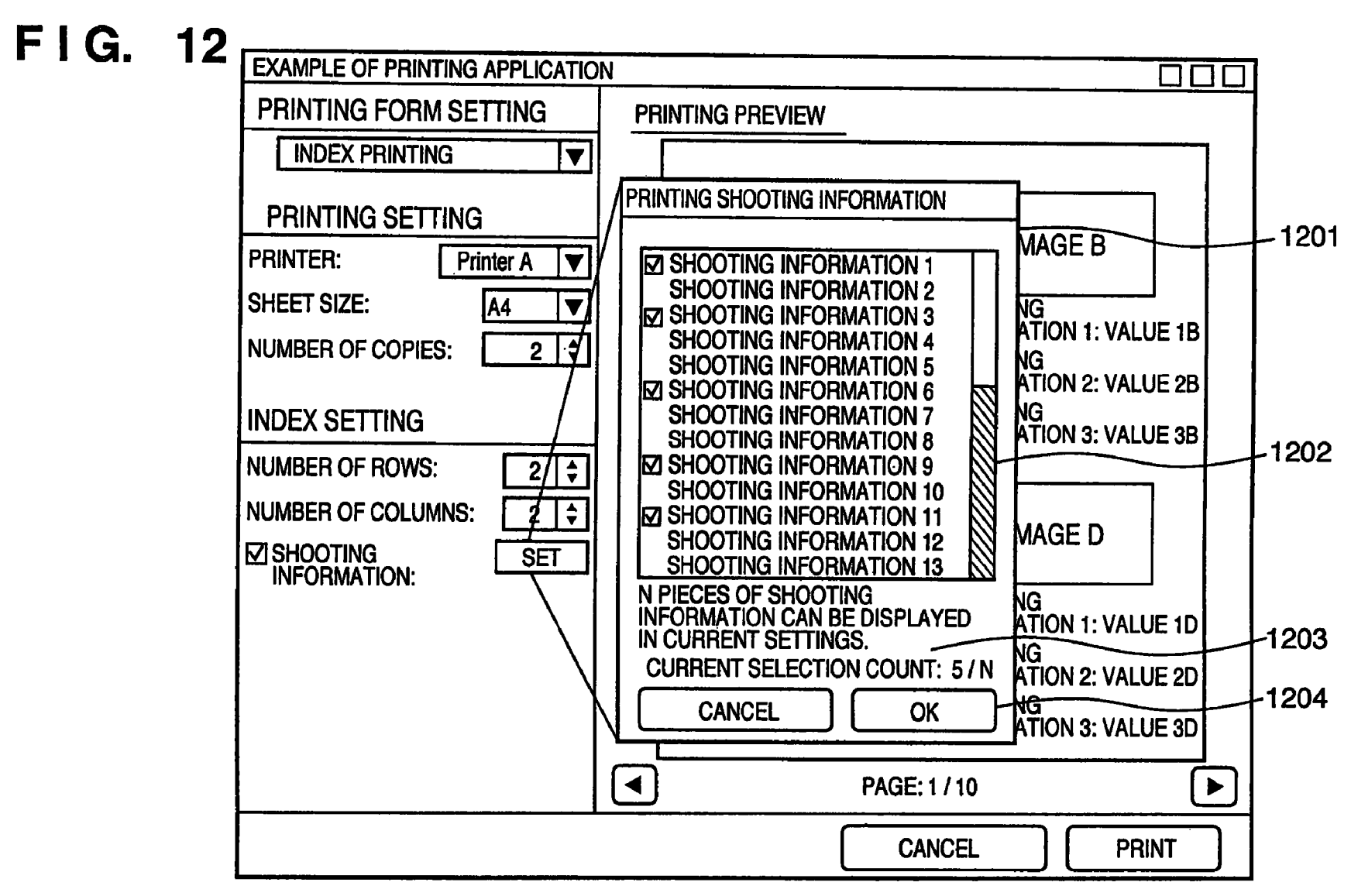

FIG. 12 is a view showing an example of displaying the displayable shooting information count in an information display setting dialog 1201. N (integer) in an area 1203 is a maximum displayable information count. If the number of pieces of shooting information to be printed exceeds N, pieces of shooting information more than N pieces of shooting information selected in an area 1202 for determining display information may be disabled. Alternatively, an "OK" button may be disabled to prevent determination.

Figure 13:
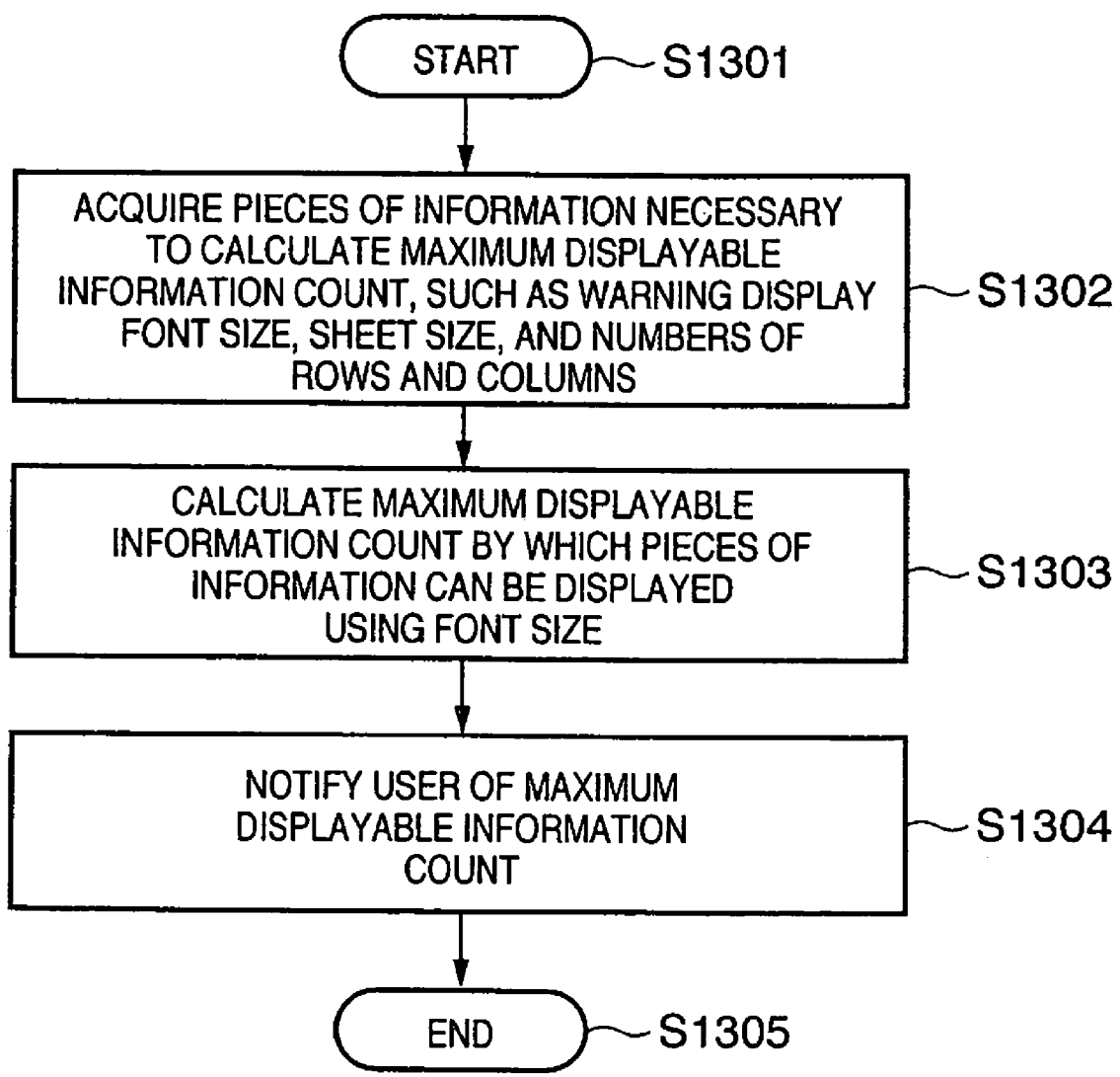
FIG. 13 is a flowchart for calculating the maximum display information count.

FIG. 13 is a flowchart for determining the maximum displayable information count.

The process starts from step S1301 at the timing when the information display setting dialog 1201 is displayed.

In step S1302, pieces of information necessary to predict the maximum displayable information count, such as the font size at which a warning is displayed, the sheet size, and the numbers of rows and columns, are acquired. In step S1303, the maximum displayable information count is calculated using these pieces of information. In step S1304, the maximum displayable information count is displayed in the area 1203 to notify the user of the maximum displayable information count.

After setting, if the user changes settings necessary to predict the maximum displayable information count, the information display setting dialog 1201 is forcibly displayed. Alternatively, the "print" button is disabled, and then the "set" button flickers to output a warning.

By the above operation, the user is notified of the maximum displayable information count in advance, and prompted to select pieces of shooting information smaller in number than the displayable information count. Consequently, printing can be done without displaying any warning dialog.

Third Embodiment

In the third embodiment, priority is assigned to an information display item, in addition to the method described in the second embodiment.

Figure 14:
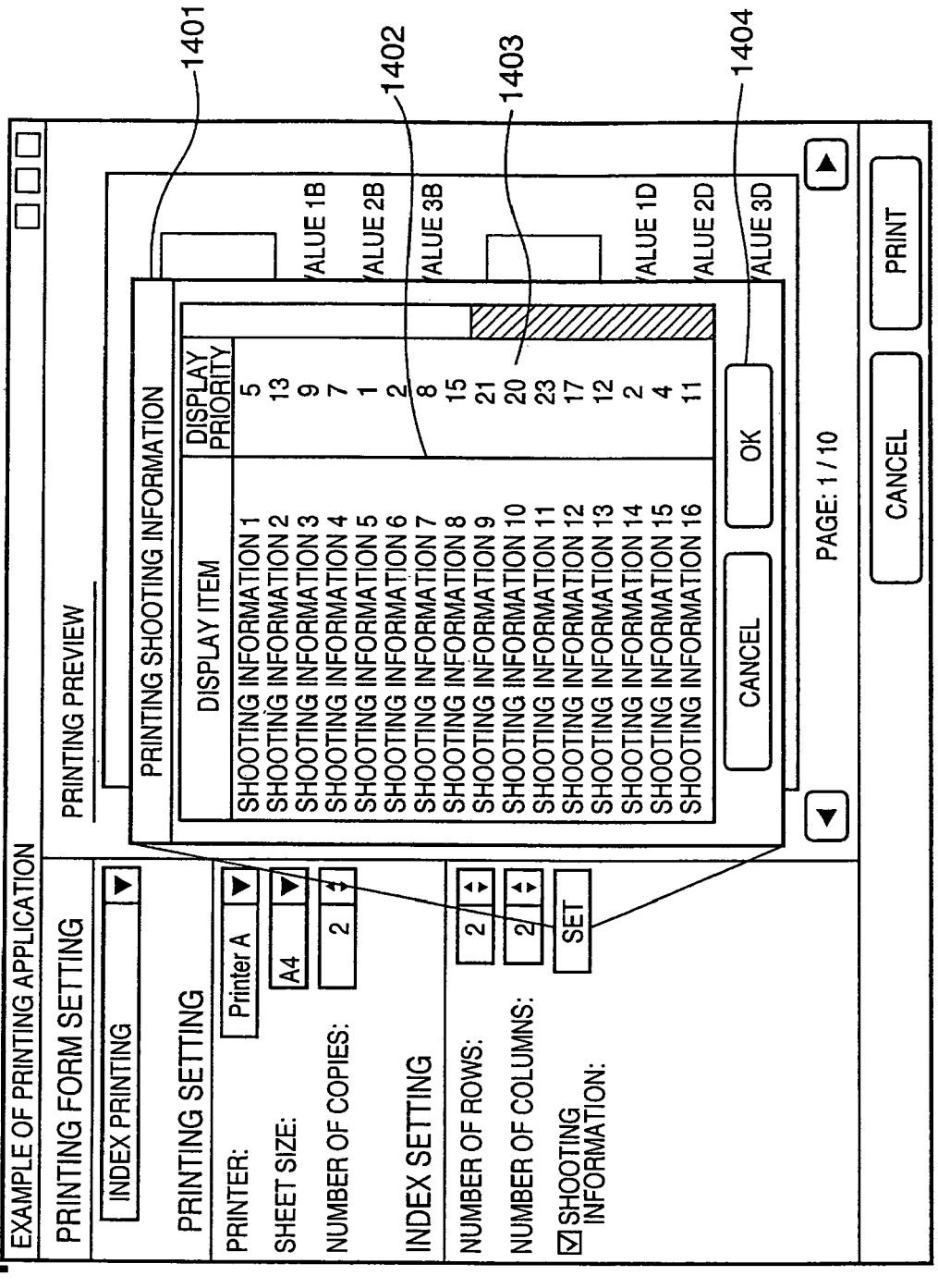
FIG. 14 is a view showing an example of a dialog in which priority is assigned to shooting information.

FIG. 14 shows a display setting dialog 1401 in which priority is assigned. The user selects pieces of display information in an area 1402, and at the same time adds priority levels to the pieces of information in an area 1403. After setting pieces of display information and their priority levels, the user completes the settings with an "OK" button 1404. If the number of pieces of display information determined in the display setting dialog 1401 is larger than the number of pieces of information calculated in step S1303, N pieces of information are displayed in priority order in a printing preview area 405. If items necessary to predict the maximum displayable information count change after setting, N is calculated again, and N pieces of information are displayed in priority order in the printing preview area 405. Even by this method, printing can be done without displaying any warning dialog.

As described above, according to the first to third embodiments, the user can perform index printing of pieces of desired shooting information. These pieces of shooting information are not cut off in the middle of them.

Further, the first to third embodiments can provide a merit of determining, without actually printing, that shooting information becomes excessively small as a result of automatically resizing it. Hence, a risk of wasteful printing can be reduced.

Fourth Embodiment

Figure 15A:
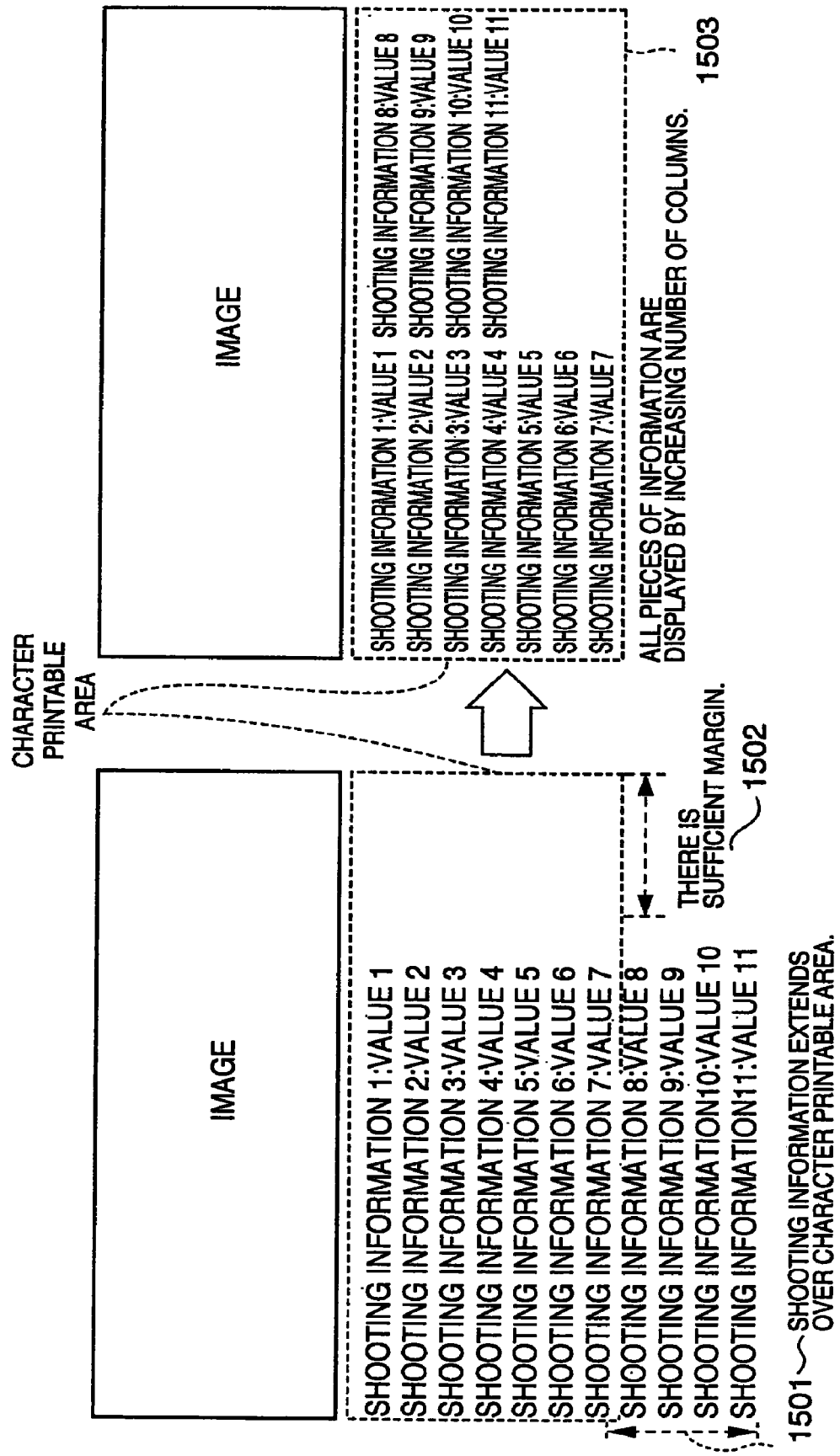
FIG. 15A is a view showing the layout of an image and shooting information in the fourth embodiment.
Figure 15B:
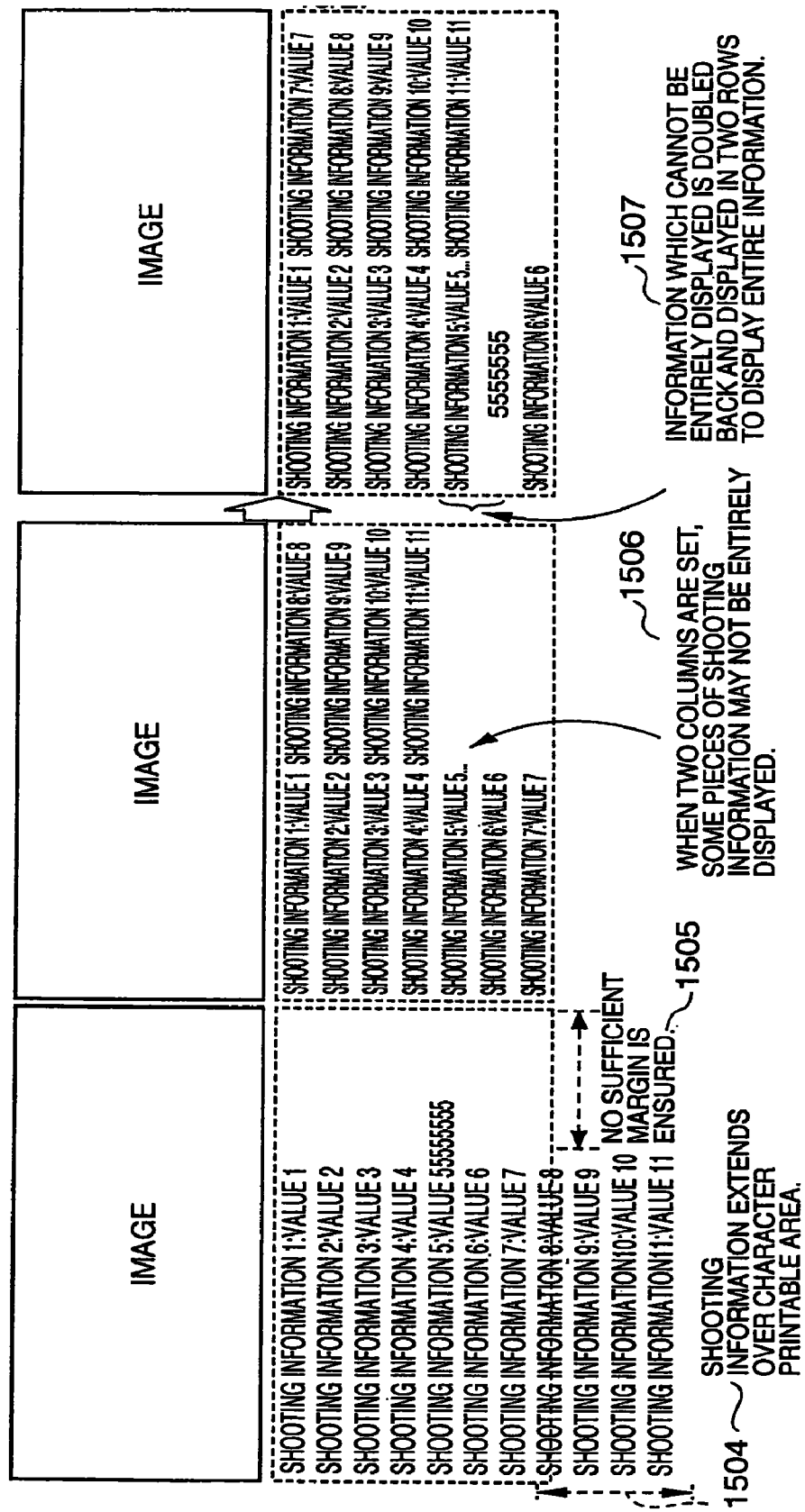
FIG. 15B is a view showing the layout of an image and shooting information in the fourth embodiment.

The fourth embodiment assumes a case as shown in FIGS. 15A and 15B. As represented by 1501, not all pieces of shooting information may be laid out in the longitudinal direction. In this case, if there is a sufficient margin 1502 for inserting a text, all the pieces of information can be displayed by increasing the number of columns, as represented by 1503.

If all pieces of shooting information cannot be displayed in one column, it is attempted to display them in N columns by increasing the number of columns, as represented by 1503. However, when the number of columns is increased, the width at which the character string can be displayed decreases. When information is long as represented by 1505, the entire information may not be displayed upon increasing the number of columns, as represented by 1506. In this case, the information is displayed in a plurality of rows, as represented by 1507, preventing cutoff of the information.

In some cases, all pieces of information can be displayed in a plurality of columns. In other cases, not all pieces of information can be printed even in a plurality of columns because the printable area is finite.

An example of an algorithm for determining these cases will be explained.

Let P_H and P_W be the height and width of the text area for printing shooting information of each image.

Let S_H and $S\_W_N$ be the height and width of a piece of shooting information. N is the number of pieces of shooting information. Shooting information depends on the length of a character string, the width changes between pieces of shooting information, and thus the widths of pieces of shooting information are discriminated by $S\_W_0$ to $S\_W_N$.

The number of rows of shooting information falling within the text area can be obtained by P_H/S_H. If there are a plurality of columns C, the total number of rows can be obtained by (P_H/S_H)*C. A case will be examined where, when a plurality of columns are set, shooting information extends over one row, as represented by 1506. When no information can be completely displayed, the information may not make any sense. Thus, if information extends over one row, it is displayed in a plurality of rows, as represented by 1507.

Figure 16:
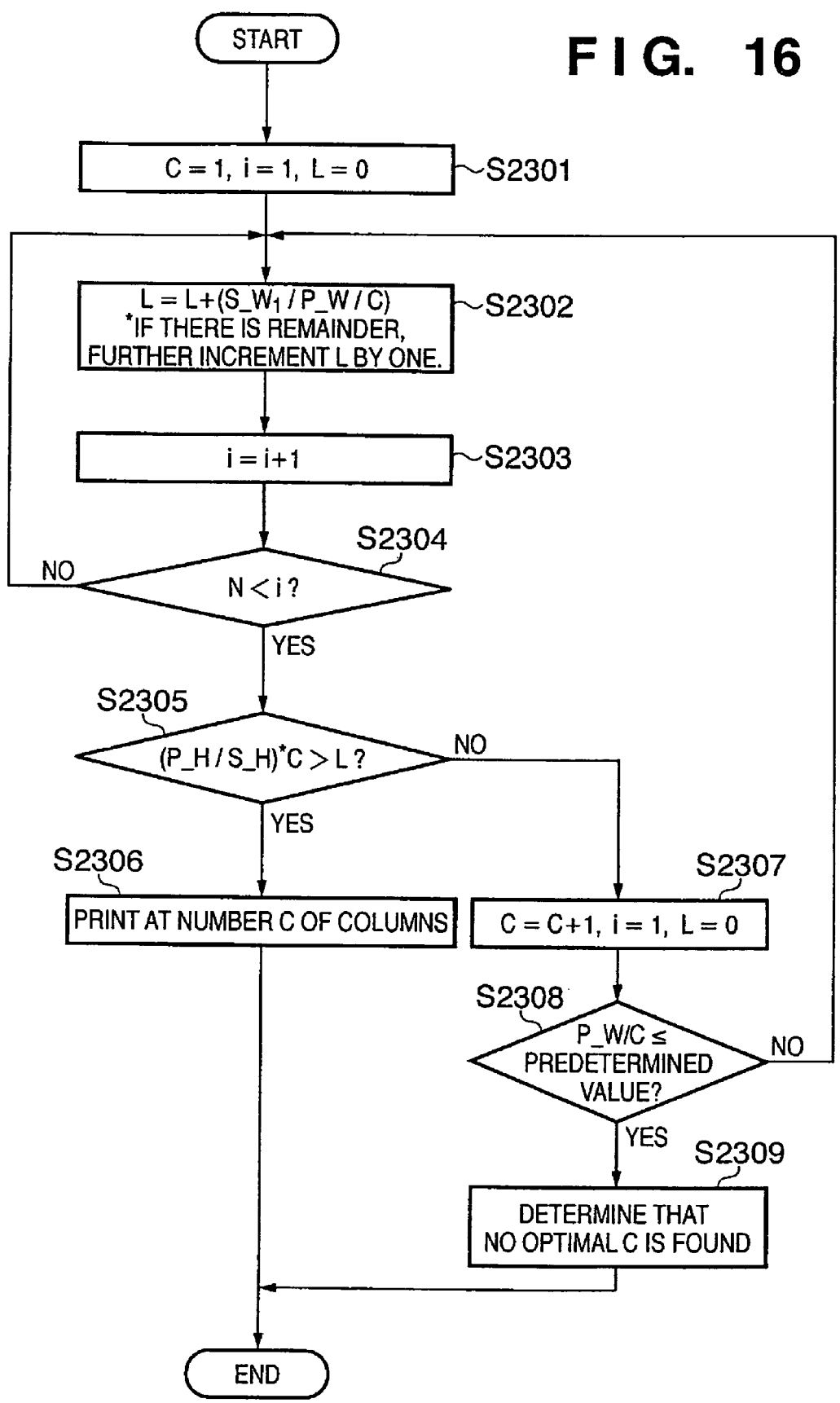
FIG. 16 is a flowchart showing an operation in the fourth embodiment.

These processes are shown as a flowchart in FIG. 16.

In step S2301, the number C of display columns, variable i, and the number L of rows necessary to display all pieces of shooting information are initialized to proper values. In this case, the number C of columns is initialized to 1; i, to 1; and the number L of rows, to 0. In step S2302, the number of rows necessary to display a piece of shooting information is obtained and added to L. In steps S2303 and S2304, the variable i is incremented by one, and compared with N to determine whether i is larger than N. Step S2302 is executed N times corresponding to the number of pieces of shooting information.

By executing the above process, the number L of rows necessary to display all pieces of shooting information is attained. In step S2305, the number L of rows is compared with the number of rows printable in the text area. If L is smaller, all pieces of shooting information can be printed, and the number C of columns is finalized in step S2306 to print.

If L is larger than the number of rows printable in the text area in step S2305, it can be determined that not all pieces of shooting information can be printed in the text area. Thus, the number C of columns is incremented by one in step S2307, and the above process is performed again. Before the above process is performed again, the width of one column is confirmed in step S2308. When the number C of columns is increased, the width of the display area of shooting information which can be displayed in one row decreases. If it is determined that the width of the display area is not enough to display shooting information, not all pieces of shooting information can be displayed even by increasing the number C of columns in step S2309. Hence, it is determined that no optimal number C of columns is found, and the process ends. At the same time, a warning is displayed to the user.

In this manner, the number C of optimal columns is calculated, and the user is prompted to select it or the program automatically determines the number C of columns. This increases the possibility at which all pieces of shooting information desired by the user can be printed.

If it is determined that not all pieces of shooting information can be printed in the text area even at any number C of columns, an application of the method described in another embodiment is examined.

Fifth Embodiment

In the above embodiments, the problem that not all pieces of shooting information can be displayed is solved by changing the character size or layout. To the contrary, the fifth embodiment targets a user who thinks shooting information important, and all pieces of shooting information desired by the user are displayed by downsizing an image without changing the character size.

FIG. 17 is a view showing a state in which a shooting information setting dialog 1701 of an information processing apparatus is displayed. FIG. 18 is a flowchart showing an operation of downsizing an image without changing the character size in the fifth embodiment.

Shooting information to be printed is selected in an area 1702, and the font size of the shooting information to be printed is designated in a font designation field 1703. If the designated font size is proper, an OK button 1704 is clicked to finalize the setting contents.

For descriptive convenience, pieces of shooting information are displayed in one column. Pieces of shooting information designated in the area 1702 are laid out in one column in the printable area at the font size designated in the font designation field 1703, as represented by 1801 in FIG. 19.

At this time, the extension-over area of pieces of shooting information is calculated in step S2401 of FIG. 18. If it is determined in step S2402 as a result of calculating the extension-over area that all the pieces of shooting information can fall within the printable area, the process ends without changing any image. If not all the pieces of shooting information can fall within the printable area, an image is downsized by the extension-over area in step S2403. If the image becomes excessively small, it makes no sense, and thus the minimum image size is determined. In the fifth embodiment, the program handles, as the minimize image size, a size obtained when the short side becomes equal to or smaller than 160 pixels. Needless to say, the operator may also set the minimize image size. In step S2404, it is determined whether the downsized image reaches the minimum image size. If the downsized image is not minimum, the image is printed small in step S2405. If the downsized image becomes smaller than the minimum image size, the text area is examined again in step S2406. For example, examinations are made again including downsizing of characters, similar to the first to third embodiments. Alternatively, when the display image becomes equal to or smaller than a predetermined size, no image is displayed, and only pieces of shooting information are printed.

As described above, according to the fifth embodiment, the user can perform index printing while maintaining minimum visibility of characters.

Sixth Embodiment

Figure 20:
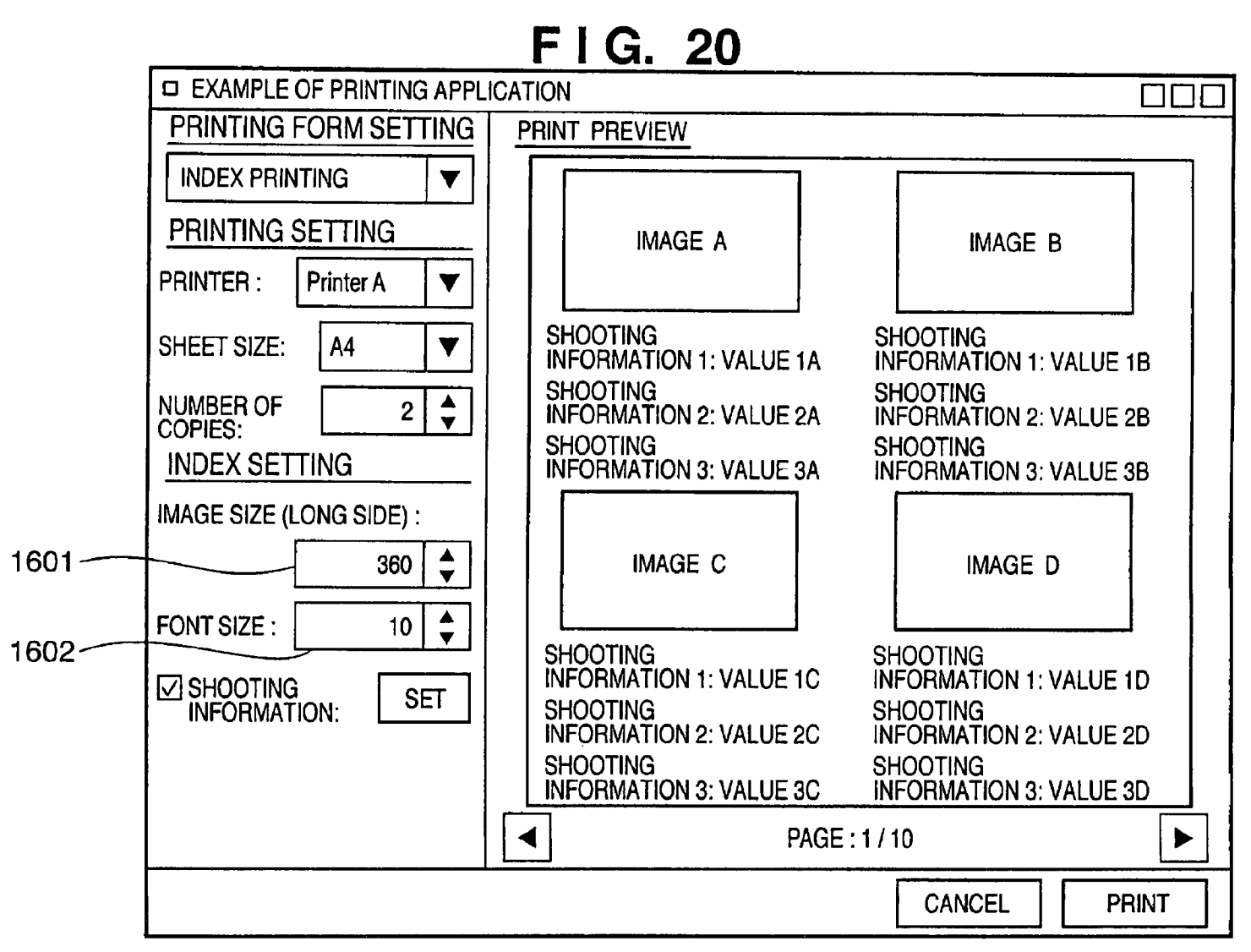

In the sixth embodiment, as shown in FIG. 20, the user is prompted to designate an image size in an image size designation field 1601 and a character size in a font size designation field 1602. The layout of index printing is automatically determined to minimize the margin on a sheet. This process is optimal when both the character size and image size are fixed.

Figure 21:
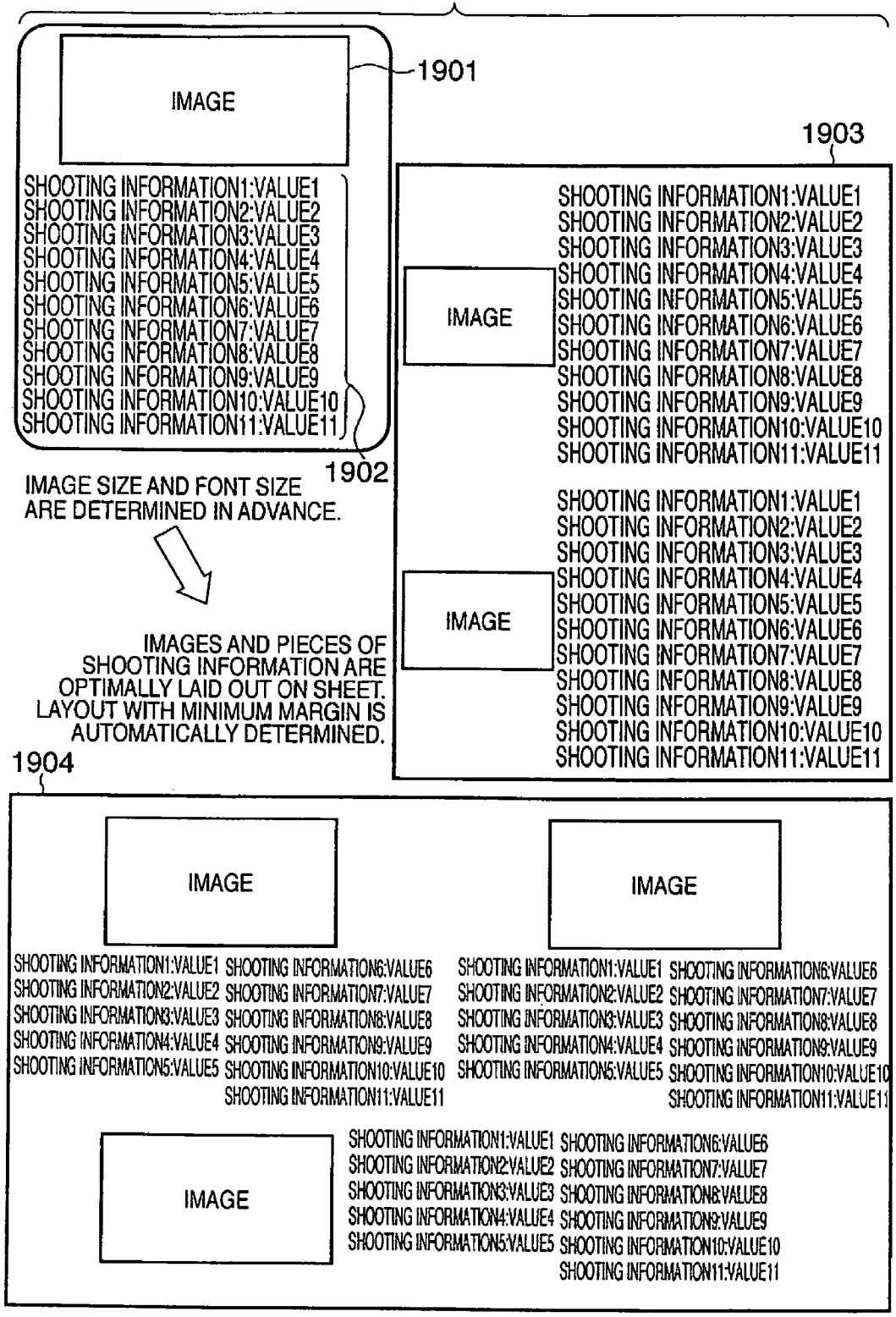
FIG. 21 is a view showing the layout of an image and shooting information in the sixth embodiment.

For example, as shown in FIG. 21, there are an image 1901 of a size set in the image size designation field 1601, and shooting information 1902 of a font size set in the font size designation field 1602. Since the sizes of the image 1901 and shooting information 1902 are determined, a necessary printing area can be obtained from the image area and font size. After the printing area is obtained, a layout which is most efficient for a sheet, i.e., minimizes the margin is set.

For example, various layouts to efficiently lay out the images 1901 and pieces of shooting information 1902 on a sheet 1903 are examined by the program. In this case, it is determined that it is most efficient to lay out images in the first column and pieces of shooting information in the second column. Then, the images and pieces of shooting information are laid out.

In rearrangement, the layout of images and text printing areas need not be the same as the layout on the sheet 1903 because the purpose of rearrangement is to minimize the margin. For example, in layout on a sheet 1904, a longitudinal layout of images and pieces of shooting information and a lateral layout of images and pieces of shooting information may coexist.

By determining the sizes of an image and shooting information, as described above, the printing area is obtained in advance, then various combinations are so examined as to minimize the margin on a sheet, and images and pieces of shooting information are arranged in an optimal layout.

As described above, the sixth embodiment can provide index printing at both an image size and character size desired by the user.

Seventh Embodiment

In the seventh embodiment, the sheet is automatically changed to a larger one when not all pieces of information can be laid out in a printing method of setting an image size in an image size designation field 1601 of FIG. 20, setting a font size in a font size designation field 1602, and fixing a layout.

Figure 22:
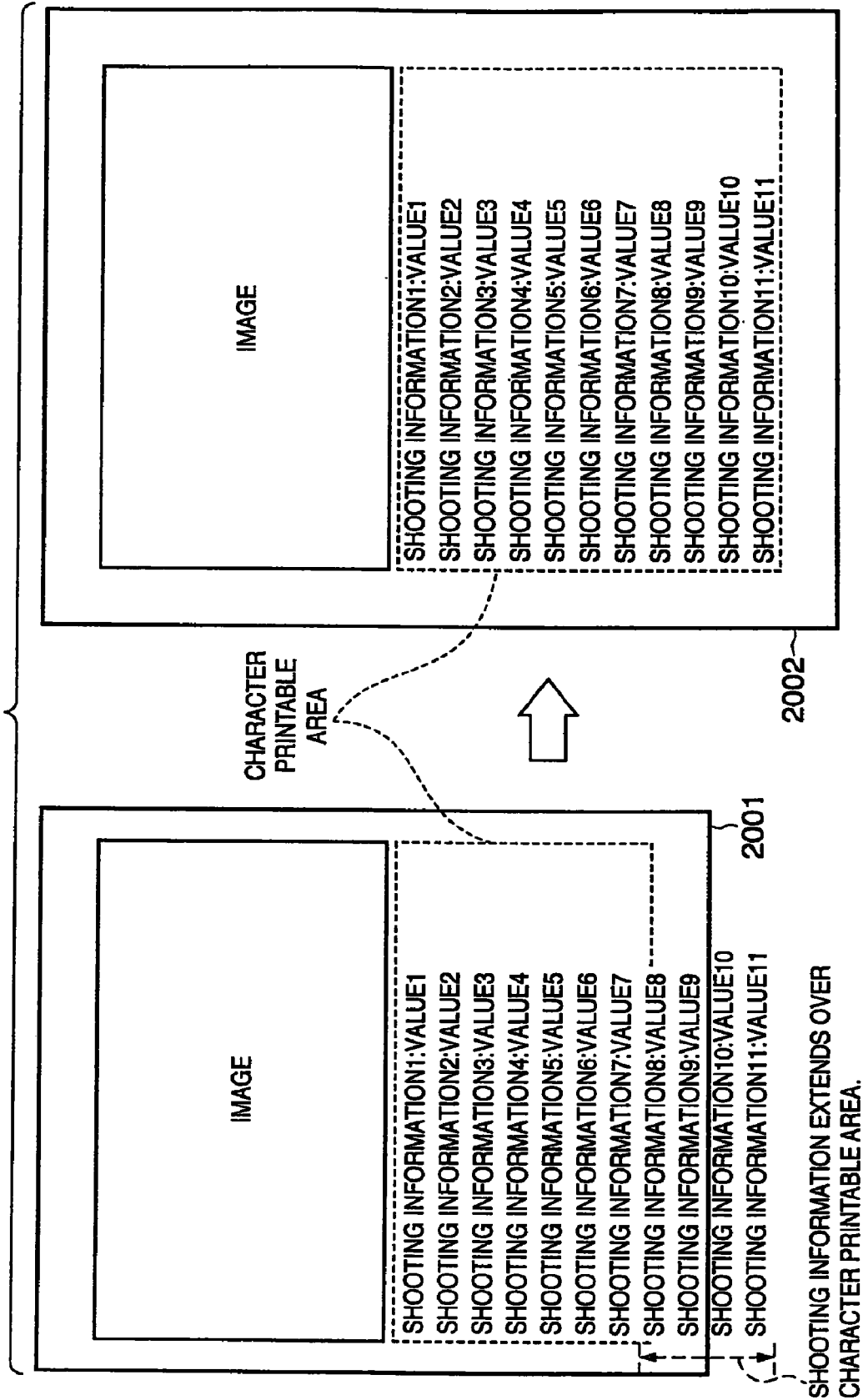
FIG. 22 is a view showing the relationship between the sheet size, the image, and shooting information in the seventh embodiment.
Figure 23:
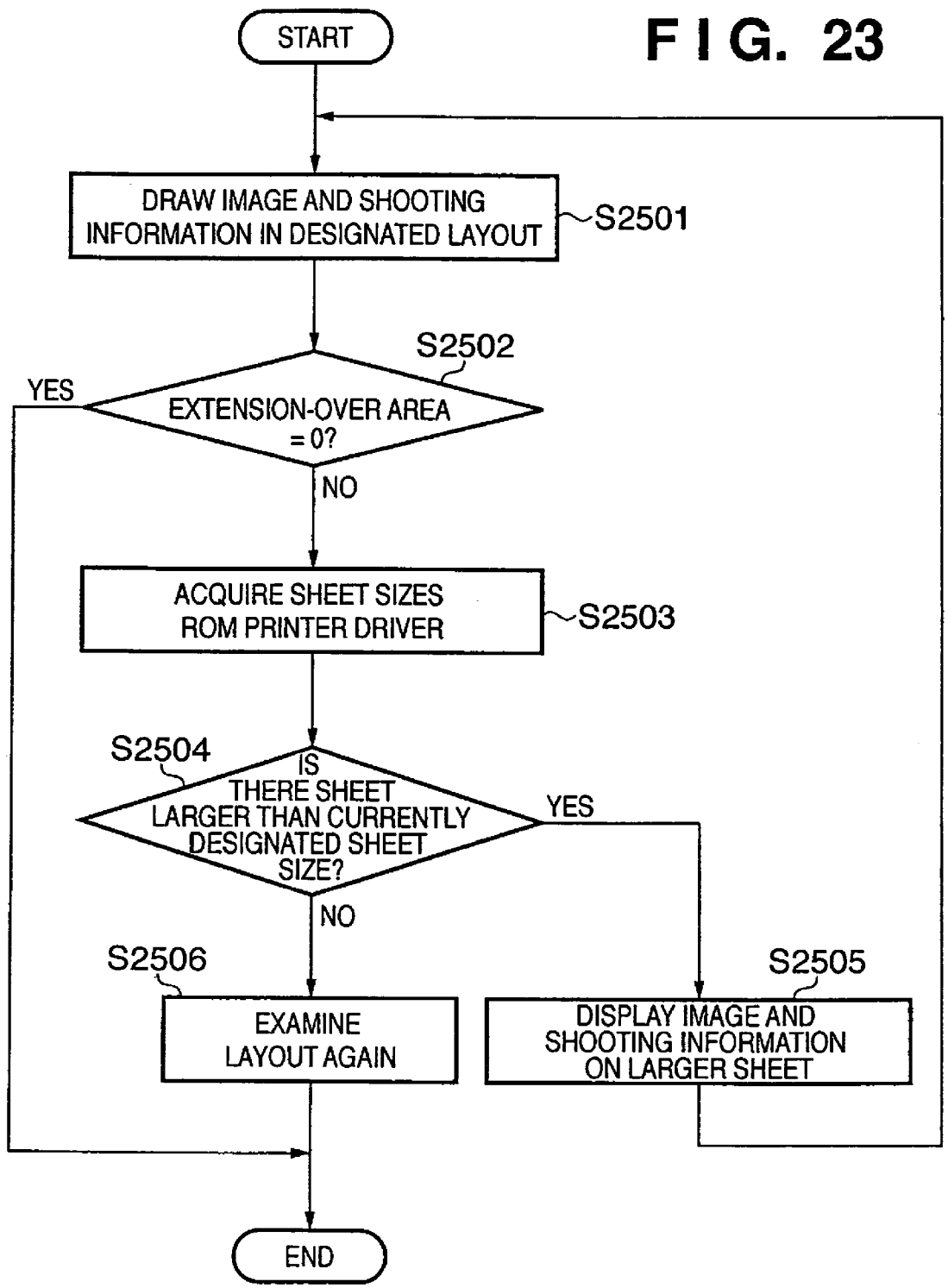
FIG. 23 is a flowchart showing an operation of automatically changing the sheet size in the seventh embodiment.

FIG. 22 is a view showing the relationship between the sheet size, the image, and shooting information. FIG. 23 is a flowchart showing an operation of automatically changing the sheet size.

For example, an image and pieces of shooting information are laid out in the longitudinal direction, and laid out in one column on a sheet. When an L-size sheet 2001 is designated as a sheet, as shown in FIG. 22, the image and pieces of shooting information are drawn on the window in a designated layout in step S2501. In step S2502, it is checked whether the pieces of shooting information extend over the window upon drawing in the designated layout on the screen. If no extension-over area is generated, the process ends. If it is determined that the extension-over area is generated, information is acquired from the printer in step S2503 to acquire a list of sheet sizes printable by the printer. If a sheet larger than the currently set one exists in the acquired sheet sizes, the setting is automatically changed. The image and pieces of shooting information are drawn again on the window in step S2503, and it is checked in step S2502 whether the pieces of shooting information extend over the window. If the sheet is proper, the process ends. By repetitively performing this process, an appropriate sheet is detected.

If no optimal sheet can be acquired in step S2504, the user is prompted to examine the layout again in step S2506, and the process ends.

By automatically changing the sheet to a larger one and printing, all pieces of shooting information desired by the user can be printed without downsizing any image, downsizing any character, and changing any layout.

Eighth Embodiment

In the eighth embodiment, the layout is automatically changed by changing the number of pieces of shooting information.

Figure 25:
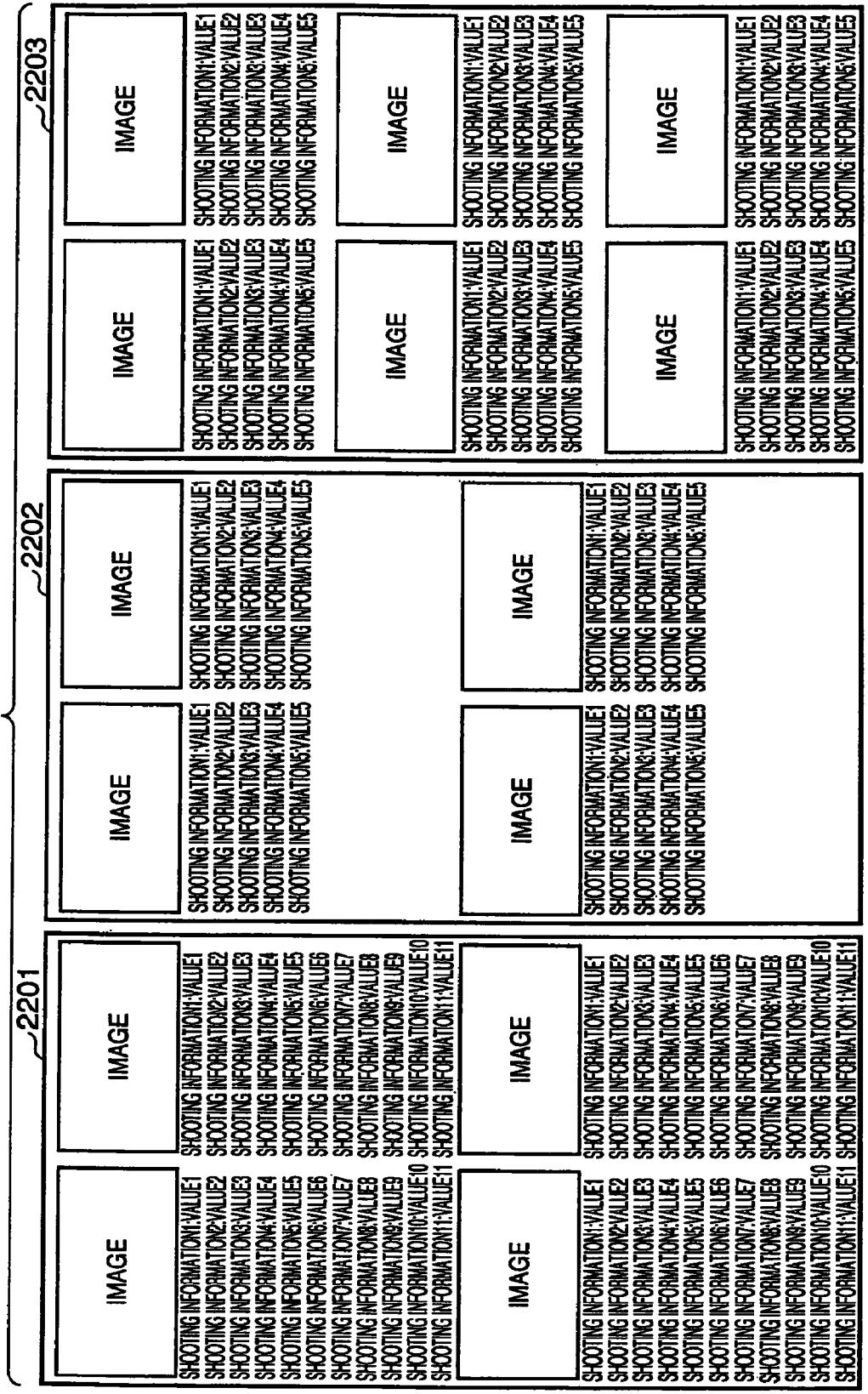
FIG. 25 is a view showing the layout of an image and shooting information on the screen in the eighth embodiment.

FIG. 24 is a view showing a layout setting window. FIG. 25 is a view showing the layout of images and pieces of shooting information on the screen. FIG. 26 is a flowchart showing an operation in the eighth embodiment.

For example, the user determines a layout 2201 in FIG. 25 in the setting window of FIG. 24. The user can determine a layout in detail by setting the number of rows in a row count designation field 2101, the number of columns in a column count designation field 2102, pieces of shooting information in a shooting information designation field 2103, and an image size in an image size designation field 2104. As for the shooting information, the shooting information designation field 2103 is operated to open a dialog 2105. The number of pieces of shooting information is determined in an area 2106, and the font size of shooting information is determined in a font size designation field 2107. By these settings, the numbers of rows and columns are set to 2, the number of pieces of shooting information is set to 11, and the image size is set to 160 pixels, as represented by 2201 in FIG. 25.

Assume that the number of pieces of shooting information is changed after the end of the above settings. In the eighth embodiment, the number of pieces of shooting information is decreased from 11 to 5 while the remaining settings are kept unchanged. Then, a margin is generated on the sheet, as represented by 2202.

In the eighth embodiment, the margin area is calculated again upon a change of the settings to automatically arrange images and pieces of shooting information in an optimal layout. In the eighth embodiment, images and pieces of shooting information can be added by one row as a result of calculating the total margin. Thus, the layout 2201 is automatically changed to increase the number of rows from two to three. In this example, a margin is generated to increase the number of images. To the contrary, when the number of pieces of shooting information is increased, it is examined to decrease the number of images.

FIG. 26 is a flowchart showing the above process.

In step S2601, images and pieces of shooting information are drawn on the window in a re-designated layout. It is calculated in step S2602 whether a margin is generated or pieces of shooting information cannot fall within a sheet and extend over the sheet. If a margin is generated, the margin area is calculated in step S2603. If not all pieces of shooting information can fall within a sheet, the extension-over area is calculated in step S2606. In step S2604, it is determined where the margin or extension-over area is generated on the sheet. If the margin or extension-over area is generated downward, the layout is changed in the longitudinal direction in step S2605. If the margin or extension-over area is generated in the lateral direction, the layout is changed in the lateral direction in step S2607.

Even when the layout must be changed again upon an increase/decrease in the number of pieces of shooting information, the layout can be automatically changed by the program by the above processes, reducing the burden on the user.

Ninth Embodiment

In the first to eighth embodiments, shooting information is always printed together with an image. In the ninth embodiment, the user can select whether to print only an image or print shooting information together with an image.

More specifically, an item "no shooting information" is set in the shooting information list in the setting window shown in FIG. 5, and the user can select the item. In the setting window shown in FIG. 5, the user can also set not to print any shooting information, and can also select the number of pieces of shooting information to be printed.

In this case, the personal computer system controls the number of images to be printed on a sheet as follows.

When the user selects not to print any shooting information, a larger number of images can be printed by the number of pieces of shooting information which are not printed. On an elongated sheet, for example, a total of eight images are printed in four rows in the longitudinal direction and two columns in the lateral direction.

When the user selects to print one to four pieces of shooting information, the image printing area is decreased by the number of pieces of shooting information. For example, a total of six images are printed on one sheet in three rows in the longitudinal direction and two columns in the lateral direction.

When the user selects to print five to 10 pieces of shooting information, the image printing area is further decreased. For example, a total of four images are printed on one sheet in two rows in the longitudinal direction and two columns in the lateral direction.

Hence, even if the layout must be changed again upon an increase/decrease in the number of pieces of shooting information (including 0 shooting information), the layout can be automatically changed by the program by the above processes, reducing the burden on the user.

Note that a combination of the number of pieces of shooting information and the number of images to be printed on one sheet is merely an example, and another combination can also be adopted, as a matter of course.

Other Embodiment

The objects of the embodiments are also achieved by the following method. More specifically, a storage medium (or recording medium) which stores software program codes for implementing the functions of the above-described embodiments is supplied to a system or apparatus. Then, the computer (or the CPU or MPU) of the system or apparatus reads out and executes the program codes stored in the storage medium. In this case, the program codes read out from the storage medium implement the functions of the above-described embodiments, and the storage medium which stores the program codes constitutes the present invention. The functions of the above-described embodiments are implemented when the computer executes the readout program codes. Also, the present invention includes the following case. More specifically, an operating system (OS) or the like running on the computer performs some or all of actual processes on the basis of the instructions of the program codes, thereby implementing the functions of the above-described embodiments.

The present invention also includes the following case. More specifically, the program codes read out from the storage medium are written in the memory of a function expansion card inserted into the computer or the memory of a function expansion unit connected to the computer. Thereafter, the CPU of the function expansion card or function expansion unit performs some or all of actual processes on the basis of the instructions of the program codes, thereby implementing the functions of the above-described embodiments.

When the present invention is applied to the storage medium, the storage medium stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-235496 filed Aug. 15, 2005 and No. 2006-193237 filed Jul. 13, 2006, which are hereby incorporated by reference herein in their entirety.

What is claimed is:

1. An information processing apparatus which controls a printing unit to print an image and shooting information of the image on one printing medium, comprising:
   a selection unit which allows a user to select shooting information to be printed on the printing medium from a plurality of pieces of shooting information added to the image;
   a laying out unit which lays out the image and the shooting information selected by said selection unit that are to be printed on the printing medium, wherein said laying out unit lays out the shooting information added to the image in a predetermined character area; and
   an adjusting unit which adjusts a layout of the shooting information which is to be laid out in the predetermined character area, wherein said adjusting unit lays out the shooting information selected by said selection unit in the predetermined character area by increasing a number of columns when the shooting information selected by said selection unit cannot be laid out with single column in the predetermined character area.

2. The apparatus according to claim 1, wherein said laying out unit lays out one piece of shooting information for each row in the predetermined character area.

3. The apparatus according to claim 2, wherein said adjusting unit adjusts the layout of the shooting information such that the one piece of shooting information is laid out over a plurality of rows when a width of columns becomes small by increasing a number of columns and the one piece of shooting information cannot be laid out in one row.

4. The apparatus according to claim 1, wherein said adjusting unit adjusts a number of columns based on a number of pieces of shooting information selected by said selection unit.

5. The apparatus according to claim 1, wherein said selection unit displays a list of the plurality of pieces of shooting information on a screen and allows a user to select desired shooting information from the list.

6. The apparatus according to claim 1, wherein said adjusting unit adjusts an arrangement and a font size of the shooting information such that the shooting information selected by said selection unit is printed in the predetermined character area.

7. The apparatus according to claim 6, further comprising a display unit which displays a warning message when the font size adjusted by said adjusting unit becomes smaller than a predetermined font size.

8. The apparatus according to claim 7, further comprising a size setting unit which allows a user to set the predetermined font size.

9. The apparatus according to claim 7, further comprising a size changing unit which changes the predetermined font size based on a resolution of said printing unit.

10. The apparatus according to claim 6, further comprising a display unit which displays a number of pieces of shooting information which can be printed in the predetermined character area while keeping the font size not less than the predetermined font size.

11. The apparatus according to claim 6, further comprising a shooting information number adjusting unit which reduces a number of pieces of shooting information selected by said selection unit in a case that the font size adjusted by said adjusting unit becomes smaller than the predetermined font size.

12. The apparatus according to claim 11, wherein said shooting information number adjusting unit reduces a number of the shooting information selected by said selection unit based on a priority level of the shooting information.

13. The apparatus according to claim 6, further comprising a display unit which displays a print preview image of the shooting information whose font size is adjusted by said adjusting unit.

14. An information processing method of controlling a printing unit to print an image and shooting information of the image on one printing medium, comprising:
   a selecting step of allowing a user to select shooting information to be printed on the printing medium from a plurality of pieces of shooting information added to the image;
   a laying out step of laying out the image and the shooting information selected in said selecting step that are to be printed on the printing medium, wherein said laying out step lays out the shooting information added to the image in a predetermined character area; and
   an adjusting step of adjusting a layout of the shooting information which is to be laid out in the predetermined character area, wherein said adjusting step lays out the shooting information selected in said selection step in the predetermined character area by increasing a number of columns in a case that the shooting information selected in said selecting step cannot be laid out with single column in the predetermined character area.

15. The method according to claim 14, wherein said laying out step lays out one piece of shooting information for each row in the predetermined character area.

16. The method according to claim 15, wherein said adjusting step adjusts the layout of the shooting information such that the one piece of shooting information is laid out over a plurality of rows in a case that a width of a column becomes small by increasing a number of columns and the one piece of shooting information cannot be laid out in one row.

17. The method according to claim 14, wherein said adjusting step adjusts a number of columns based on a number of pieces of the shooting information selected by said selection unit.

18. The method according to claim 14, wherein said selection step displays a list of the plurality of pieces of shooting information on a screen and allows a user to select desired shooting information from the list.

19. The method according to claim 14, wherein said adjusting step adjusts an arrangement and a font size of the shooting information such that the shooting information selected by said selection unit is printed in the predetermined character area.

20. The method according to claim 19, further comprising a display step of displaying a warning message in a case that the font size adjusted by said adjusting step becomes smaller than a predetermined font size.

21. The method according to claim 20, further comprising a size setting step of allowing a user to set the predetermined font size.

22. The method according to claim 20, further comprising a size changing step of changing the predetermined font size based on a resolution of said printing unit.

23. The method according to claim 19, further comprising a display step of displaying a number of pieces of shooting information which can be printed in the predetermined character area while keeping the font size not less than the predetermined font size.

24. The method according to claim 19, further comprising a shooting information number adjusting step of reducing a number of shooting information selected by said selection step when the font size adjusted by said adjusting step becomes smaller than the predetermined font size.

25. The method according to claim 24, wherein said shooting information number adjusting step reduces a number of pieces of the shooting information selected by said selection step based on a priority level of the shooting information.

26. The method according to claim 19, further comprising a display step of displaying a print preview image of the shooting information whose font size is adjusted by said adjusting step.

* * * * *